United States Patent [19]

Weaver et al.

[11] Patent Number: 5,263,124
[45] Date of Patent: Nov. 16, 1993

[54] METHOD FOR PRODUCING A BINARY TREE, PATTERN RECOGNITION AND BINARY VECTOR CLASSIFICATION METHOD USING BINARY TREES, AND SYSTEM FOR CLASSIFYING BINARY VECTORS

[75] Inventors: Charles S. Weaver, Palo Alto; Constance T. Chittenden, Los Altos, both of Calif.

[73] Assignee: Neural Systems Corporation, Los Altos Hills, Calif.

[21] Appl. No.: 661,330

[22] Filed: Feb. 27, 1991

[51] Int. Cl.$^5$ .............................................. G06K 9/68
[52] U.S. Cl. ........................................ 382/37; 382/39; 382/41; 382/14; 382/15
[58] Field of Search .................. 364/513; 382/14, 15, 382/30, 34, 36, 37, 39, 41, 49, 56

[56] References Cited

U.S. PATENT DOCUMENTS

| | | | |
|---|---|---|---|
| 3,918,047 | 11/1975 | Denes | 382/41 |
| 4,286,330 | 8/1981 | Isaacson | 382/49 |
| 4,535,320 | 8/1985 | Weaver | 382/41 |
| 4,682,365 | 7/1987 | Orita et al. | 382/37 |
| 4,805,225 | 2/1989 | Clark | 382/39 |
| 4,852,173 | 7/1989 | Bahl et al. | 382/37 |
| 4,853,696 | 8/1989 | Mukhersee | 382/56 |
| 4,870,695 | 9/1989 | Gonzales et al. | 382/41 |
| 4,914,708 | 4/1990 | Carpenter et al. | 382/14 |
| 4,944,023 | 7/1990 | Imao et al. | 382/37 |
| 4,989,258 | 1/1991 | Takahashi et al. | 382/37 |

OTHER PUBLICATIONS

C. S. Weaver, "Some Properties of Threshold Logic Unit Pattern Recognition Networks" IEEE Trans. on Comp. vol. C-24, No. 3, Mar. 1975, pp. 290-298.

D. E. Rumelhart et al., "Parallel Distributed Processing; Explorations in the Microstructure of Cognition" vol. 1 1986, pp. 318-362.

S. J. Friedman et al., "Finding the Optimal Variable Ordering for Binary Decision Diagrams" IEEE Trans on Comp. vol. 39, No. 5, May 1990, pp. 710-713.

*Primary Examiner*—Jose L. Couso
*Attorney, Agent, or Firm*—Victor R. Beckman

[57] ABSTRACT

A binary tree and method of producing a binary tree are shown, together with artificial neural networks which include processing units of binary trees. The binary tree-producing method includes obtaining a set of binary training pattern vectors some of which are associated with a first pattern to be recognized, and the remainder of which are not associated with the first pattern. Those associated with the first pattern and the remainder are identified as category 1 and category 0 vectors, respectively. The set of vectors is used to generate a binary tree in computer memory, which tree includes a sequence of binary doublets each of which represents a tree node. One of four branch conditions is identified by each doublet including no branches, branch only left, branch only right or branch both left and right. The sequence of binary doublets is used to classify binary vectors. A hardware version of the tree may be implemented which includes a plurality of AND gates (1L, 1R, 2L, 2R, 3L and 5L) interconnected in an N-level binary tree (FIG. 3) to which N binary inputs ($X_1$, $X_2$ and $X_3$) are connected to separate levels of the tree. Leaf nodes of the AND gate binary tree are connected to an OR gate (20), and a start signal (S) is supplied to the root node (1) of the tree.

28 Claims, 27 Drawing Sheets

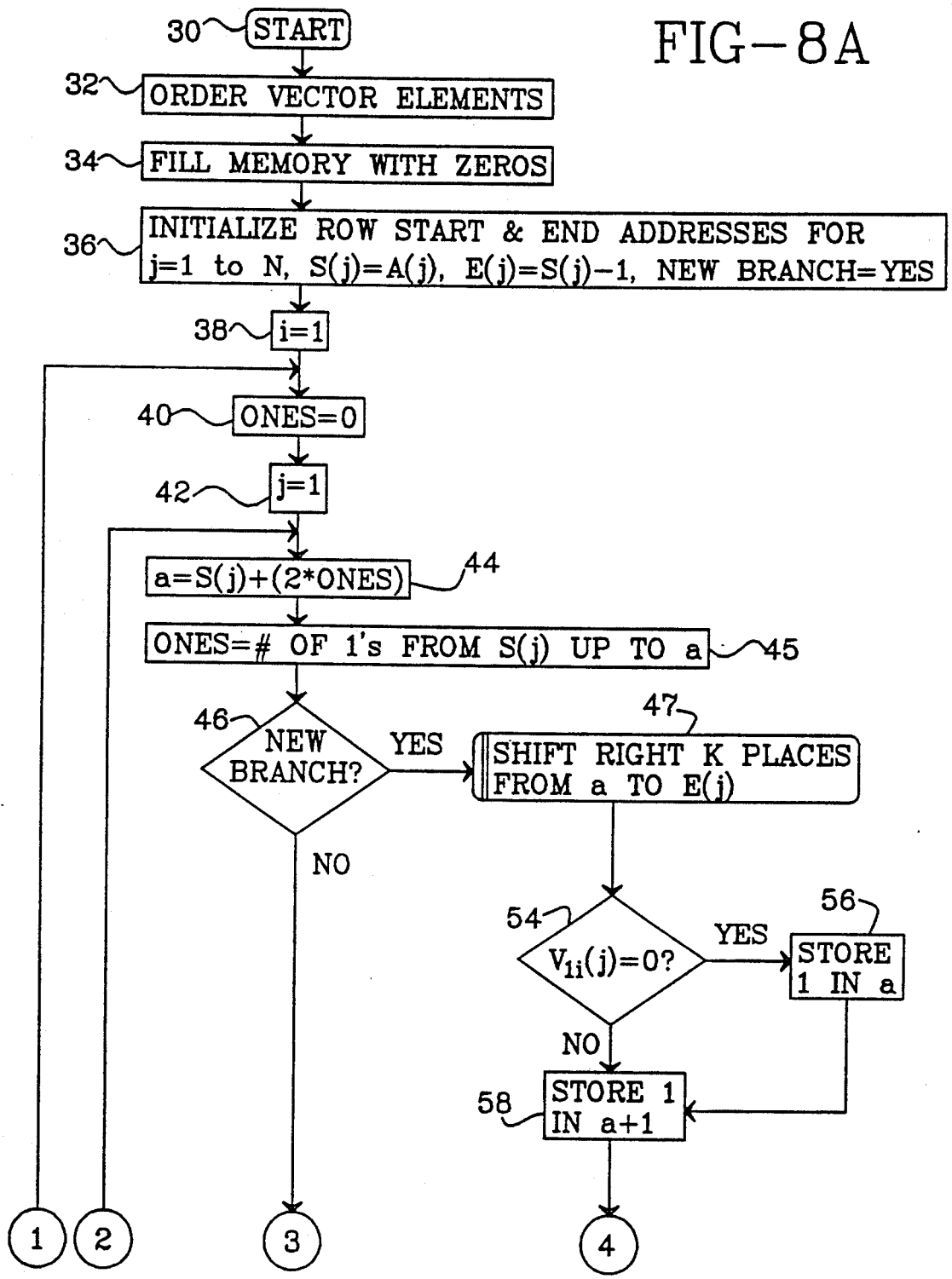

FIG-9

| | Addresses 1-26 | ONES | i | j | NB | Line |
|---|---|---|---|---|---|---|
| INITIALIZE | 00 00 00 00 00 00 00 00 00 00 00 00 00 | 0 | 1 | 1 | Y | 1 |
| V₁₁ { 0 | 00 10 00 00 00 00 00 00 00 00 00 00 00 | 0 | 1 | 1→2 | Y | 2 |
| 0 | 00 10 00 00 00 10 00 00 00 00 00 00 00 | 0 | 1 | 2→3 | Y | 3 |
| 0 | 00 10 00 00 00 10 00 00 00 00 10 00 00 | 0 | 1→2 | 3→4 | Y→N | 4 |
| V₁₂ { 0 | 00 10 00 00 00 10 00 00 00 00 10 00 00 | 0 | 2 | 1→2 | N | 5 |
| 1 | 00 10 00 00 00 11 00 00 00 00 10 00 00 | 0→1 | 2 | 2→3 | N→Y | 6 |
| 0 | 00 10 00 00 00 11 00 00 00 00 10 10 00 | 1 | 2→3 | 3→4 | Y→N | 7 |
| V₁₃ { 0 | 00 10 00 00 00 11 00 00 00 00 10 10 00 | 1→0 | 3 | 1→2 | N | 8 |
| 1 | 00 10 00 00 00 11 00 00 00 00 10 10 00 | 0→1 | 3 | 2→3 | N | 9 |
| 1 | 00 10 00 00 00 11 00 00 00 00 10 11 00 | 1→2 3→4 3→4 | | | N→Y→N | 10 |
| V₁₄ { 1 | 00 11 00 00 00 11 00 00 00 00 10 11 00 | 0→1 | 4 | 1→2 | N→Y | 11 |
| 0 | 00 11 00 00 00 11 10 00 00 00 10 11 00 | 1→2 | 4 | 2→3 | Y | 12 |
| 0 | 00 11 00 00 00 11 10 00 00 00 10 11 10 | 2→3 4→5 3→4 | | | Y→N | 13 |
| CONSOLIDATE | 00 11 11 10 10 11 10 | | | | | 14 |

FIG-12

| | | Addresses | | | | | | ONES | i | j | Line |
|---|---|---|---|---|---|---|---|---|---|---|---|
| | | 1 2 | 3 4 | 5 6 | 7 8 | 9 10 | 11 12 | 13 14 | | | |
| TREE MEMORY | | B(1)E(1) 11 | S(2) 11 | E(2) 10 | S(3) 10 | 11 | | E(3) 10 | | | 1 |
| ACTIVATION MEMORY | | B(1)B(2)F(1) 00 | F(2)B(3) 00 | F(3) 00 | | | | | | | 2 |
| $V_{01}$ | 1 | a b 10 | 00 | 00 | | | | | 0→1 | 1 | 1→2 | 3 |
| | 1 | 10 | b 10 | a 00 | | | | | 1 | 1→2 | 2 | 4 |
| | 0 | 10 | 10 | 00 | | | | | | | | 5 |
| $V_{02}$ | 1 | a b 10 | 00 | 00 | | | | | 0→1 | 2 | 1→2 | 6 |
| | 0 | 10 | b 10 | a 00 | | | | | 1→2 | 2 | 2→3 | 7 |
| | 1 | 10 | 10 | b 01 | | a | | | 3 | 2→3 | | 8 |
| $V_{03}$ | 1 | a b 10 | 00 | 01 | | | | | 0→1 | 3 | 1→2 | 9 |
| | 1 | 10 | b 10 | a 01 | | | | | 1→2 | 3→4 | 2 | 10 |
| | 1 | 10 | 10 | 01 | | | | | | | | 11 |
| | | B(1)B(2)F(1) | F(2)B(3) | F(3) | | | | | | | | 12 |

FIG-15

| Line | \u2190BINARY TREE MEMORY ADDRESSES\u2192 ||||||||||||| ACTIVATION MEMORY ADDRESSES ||||||||| STEP |
|---|---|---|---|---|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 3 | 4 | 5 | 6 | 7 | 8 | 9 | 10 | |
| | S(1) | E(1) | | | | E(2) | | | | | | E(N) | | F(1) | | F(2) | | | F(3) | | | |
| 1 | 1 | 1 | 1 | 1 | 1 | 0 | 1 | 0 | 1 | 1 | 1 | 0 | | 1 | 0 | 1 | 0 | 0 | 1 | | | |
| 2 | | | | | | a | | | | | d | | | | | c | | | b | | | 162 |
| 3 | | | | | | a | | | | | d | | | | | c | | | b | | | 168→170 |
| 4 | | | | | a | | | | | | d | | | | | c | | | b | | | 172→170A |
| 5 | | | | | a | | | | | d | | | | | | c | | b | | | | 180 |
| 6 | | | | a | | | | | | | | | | | | c | | | | | | 168→170 |
| 7 | | | | a | | | | | d | | | | | | | c | | b | | | | 180 |
| 8 | 1 | 1 | 1 | 1 | 1 | 0 | 1 | 0 | 1 | E(N) 0 | | | | | | | | | | | | 186→188 |
| 9 | | | a | | | | | d | | | | | | | | c | | b | | | | 172→170A |
| 10 | | | a | | | d | | | | | | | | | | c | b | | | | | 180 |
| 11 | 1 | 1 | 1 | 1 | 1 | 0 | 1 | E(N) 0 | | | | | | | | | | | | | | 186→188 |
| 12 | | a | | | | d | | | | | | | | | c | | b | | | | | 168→170 |
| 13 | | a | | | d | | | | | | | | | | c | b | | | | | | 180 |
| 14 | a | | | | d | | | | | | | | | | c | b | | | | | | 172→170A |
| 15 | a | | d | | | | | | | | | | | | c | b | | | | | | 180 |
| 16 | 1 | 1 | 0 | 0 | 1 | 0 | 1 | 0 | | | | | | | | | | | | | | 190 |

FIG-18A

| LINE | STEP | | COMMENT | r | n | s | i | END OF TREE |
|---|---|---|---|---|---|---|---|---|
| 1 | 202 | | Get vector 1,0,0 | | | | | |
| 2 | 204 | | | 0 | 2 | | | F |
| 3 | | 206 | | | | | | |
| 4 | | 210 | $n \neq 0$ | | | | | |
| 5 | | 212 | $t_0 = 1$ | | | | | |
| 6 | | 214 | | | 1 | | | |
| 7 | | 216 | Yes | | | | | |
| 8 | | 218 | | 1 | | | | |
| 9 | | 206A | $t_1 = 1$ | 2 | 0 | | | |
| 10 | 222 | | $N_0$ | | | | | |
| 11 | 226 | | $b_0 = 1$ | | | | | |
| 12 | 228 | | $b_0 = t_1 = 1$ | | | | | |
| 13 | 232 | | $s = (2-1-1+1) = 2$ | | | 2 | | |
| 14 | 234 | | | | | | | |
| 15 | 236 | | | | | | 0 | |
| 16 | | 206B | | | | | | |
| 17 | | 210 | $n = 0$ | | | | | |
| 18 | | 246 | $n = 2 \times 2 = 4$    $r = 0$ | 0 | 4 | | | |
| 19 | | 248 | $n \neq 0$ | | | | | |
| 20 | | 212 | $t_2 = 0$ | | | | | |
| 21 | | 214 | | | 3 | | | |
| 22 | 238 | | | | | | 1 | |
| 23 | | 206B | $t_3 = 0$ | | 2 | | | |
| 24 | 238 | | | | | | 2 | |
| 25 | 240 | | $i = s$ | | | | | |
| 26 | 242 | | No | | | | | |
| 27 | | 206 | $t_4 = 1$ | 1 | 1 | | | |
| 28 | | 206A | $t_5 = 0$ | | 0 | | | |
| 29 | 226 | | $b_1 = 0$ | | | | | |
| 30 | 232 | | $s = 2(1-0-1+0) = 0$ | | | 0 | | |
| 31 | | 206 | | | | | | |
| 32 | | 210 | $n = 0?$ – Yes | | | | | |
| 33 | | 246 | $n = 2 \times 1 = 2$    $r = 0$ | 0 | 2 | | | |
| 34 | | 212 | $t_6 = 1$ | | | | | |
| 35 | | 214 | | | 1 | | | |
| 36 | | 218 | | 1 | | | | |

FIG-18B

| LINE | STEP | | COMMENT | r | n | s | i | END OF TREE |
|---|---|---|---|---|---|---|---|---|
| 37 | | | | 1 | 1 | 0 | 2 | F |
| 38 | | 206A | $t_7=0$ | | 0 | | | |
| 39 | 226 | | $b_2=0$ | | | | | |
| 40 | 232 | | | | | 0 | | |
| 41 | | 206 | | | | | | |
| 42 | | 210 | Yes | | | | | |
| 43 | | 246 | $n=2X1=2$    $r=0$ | 0 | 2 | | | |
| 44 | | 212 | $t_8=0$ | | | | | |
| 45 | | 214 | | | 1 | | | |
| 46 | | 206A | $t_9=0$ | 0 | 0 | 0 | 2 | |
| 47 | | 222 | $t_8=t_9=0$ — Category 1 Vector | | | | | T |

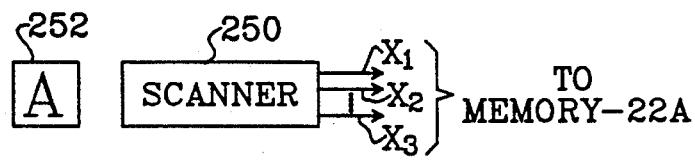
FIG-21
FIG-22
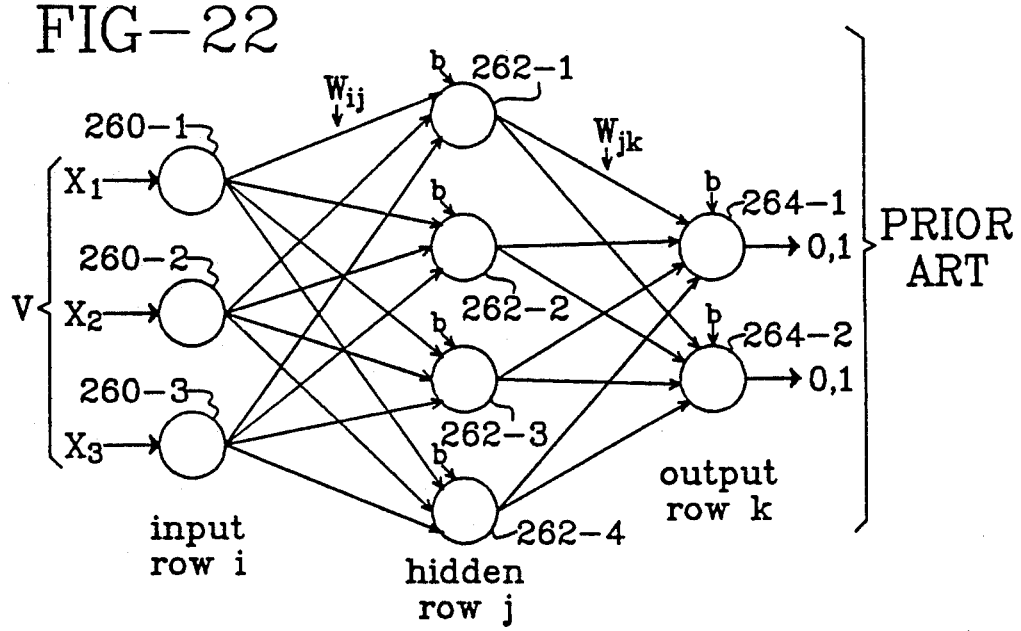
PRIOR ART
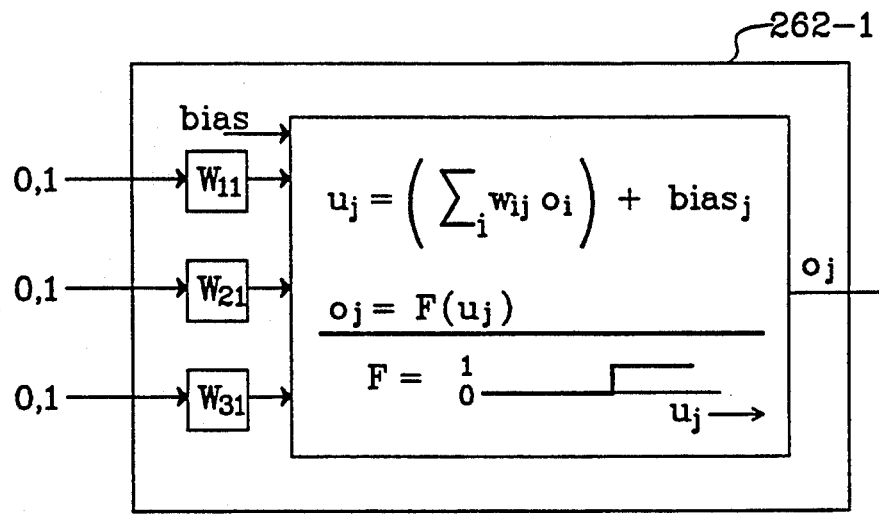
FIG-23
PRIOR ART

METHOD FOR PRODUCING A BINARY TREE, PATTERN RECOGNITION AND BINARY VECTOR CLASSIFICATION METHOD USING BINARY TREES, AND SYSTEM FOR CLASSIFYING BINARY VECTORS

FIELD OF THE INVENTION

This invention relates generally to method and means for pattern recognition, and more particularly to such method and means employing binary tree networks.

BACKGROUND OF THE INVENTION

Pattern recognition systems employing artificial neural networks are well known in the art. The term pattern is used herein in its broadest sense to include groups of signals which can be assigned meaningful classifications, which may or may not have spatial significance.

Artificial neural networks include a matrix of interconnected processing units which include a plurality of inputs. The network is trained by use of training pattern signals, which training includes the adjustment of weights at inputs to the processing units to obtain desired outputs from the network. In addition to weighting means, processing units generally include means for summing the weighted inputs, and means for processing the weighted sum. The output from the processing units often comprises a binary signal of 0 or 1.

OBJECTS AND SUMMARY OF THE INVENTION

An object of this invention is the provision of a novel binary tree for use as a processing unit of a neural network.

An object of this invention is the provision of a binary sequence of binary doublets representative of the above-mentioned binary tree.

An object of this invention is the provision of an adaptive binary tree network of the above-mentioned type which is responsive to training pattern vectors for generation of a binary tree having the desired transfer function.

An object of this invention is the provision of an AND and OR gate network implementation of the above-mentioned binary tree.

An object of this invention is the provision of method and means for generating a binary tree having a reduced number of nodes.

An object of this invention is the provision of a method for determining a vector element order for use in reordering elements of the training pattern vectors so that binary trees generated by use of the vectors with reordered vector elements include a reduced number of nodes.

An object of this invention is the provision of method and means for classifying vectors using the binary tree of this invention.

The novel binary tree of this invention may be generated by use of a digital computer with memory for storage of a binary sequence, and a set of binary training pattern vectors with equal numbers of elements. Those training pattern vectors which identify a pattern to be recognized are identified as category 1 vectors, and the remainder are identified as category 0 vectors. Using the category 1 and 0 training pattern vectors, a binary sequence of doublets is produced in which each doublet represents a node of the binary tree. The two bits in each node identify the node as one with no branches, a branch left, a branch right, or one with both left and right branches.

Different methods may be employed in the generation of the binary tree sequence. In one arrangement, a random mixture of category 0 and category 1 vectors is repeatedly processed until no additional binary doublets are added to the binary tree sequence. In another arrangement, category 1 training pattern vectors first are processed for generation of a binary tree sequence. Then, the category 0 training pattern vectors are processed for pruning unnecessary nodes from the tree. In either case, vector elements of the training pattern vectors first are reordered such that the number of nodes of binary trees generated using the vectors is greatly reduced as compared to trees constructed without such reordering of vector elements. Obviously, elements of pattern vectors to be classified using the resultant binary tree sequence are ordered the same as the training pattern vectors. A method of determining the vector element order to be employed includes locating clusters of vectors in the binary training pattern set. A measure of entropy of each vector element for each cluster is obtained. Then, using these entropy measures, a final measure of entropy of each vector element over all of the clusters is obtained, which final measures of entropy are used in the determination of vector element order to be used.

Classification of pattern vectors may be effected in software using a computer containing the binary tree sequence. Alternatively, a hardware analog of the binary tree sequence comprising AND gates and an OR gate may be employed.

BRIEF DESCRIPTION OF THE DRAWINGS

The above and other objects and advantages of the invention will be better understood from the following description when considered with the accompanying drawings. In the drawings, wherein like reference characters refer to the same parts in the several views:

FIGS. 8A, 8B and 8C together show a flow diagram for use in explaining operation of a digital computer for building a binary tree sequence in accordance with the present invention;

FIG. 9 is a chart showing the contents of memory, counters, and a flag during steps in the tree building process;

FIG. 12 is a chart showing the contents of memory and of counters during steps in the node activation process shown in FIG. 11;

FIG. 15 is a chart showing addresses and contents of binary tree and activation memories employed in the tree pruning process;

FIGS. 18A and 18B show a chart showing contents of counters and a flag during steps in the vector classification process shown in FIGS. 17A and 17B;

FIG. 21 is a diagram showing a scanner for use in obtaining binary pattern vectors for use with this invention;

FIG. 22 is a block diagram of a prior art back propagation artificial neural network;

FIG. 23 is a diagram of a prior art processing unit for use in the network shown in FIG. 22;

Generally, the elements of pattern vectors supplied to neural networks are in decimal form. However, changing the number base to binary, for example, does not change the statistical properties of the pattern vector set, such as clustering and overlap of clusters. Binary vector inputs to neural network processing units allow the use of binary logic in the units, and multiplication is not required. Binary pattern vectors are employed in the present invention.

Consider the following three-element pattern vectors:

Category 1

$$\begin{pmatrix}0\\0\\0\end{pmatrix}\begin{pmatrix}0\\0\\1\end{pmatrix}\begin{pmatrix}1\\0\\1\end{pmatrix} \text{ and } \begin{pmatrix}0\\1\\0\end{pmatrix}$$

Category 0

$$\begin{pmatrix}0\\1\\1\end{pmatrix}\begin{pmatrix}1\\1\\0\end{pmatrix} \text{ and } \begin{pmatrix}1\\1\\1\end{pmatrix}$$

As noted above, category vectors are those which identify a pattern to be recognized. In binary trees shown in FIGS. 1-3, Category vectors produce a 1 output, and Category 0 vectors do not.

Figure 1:
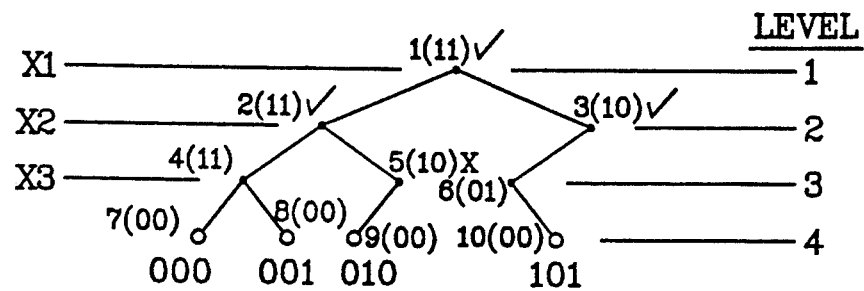
FIG. 1 shows a binary tree of a type which may be generated in accordance with this invention.

The binary tree shown in FIG. 1 comprises a root, or start, node 1 at level 1 of the tree, two branch nodes 2 and 3 at level two, three branch nodes 4, 5 and 6 at level 3, and leaf, or end, nodes 7, 8, 9, and 10 at level 4. The category 1 pattern vectors associated with the leaf nodes also are identified in FIG. 1. The first bit, or element, $X_1$ of the pattern vector is entered at the start node 1, at level 1 of the tree, and the second and third elements, $X_2$ and $X_3$, are entered at nodes at the second and third levels, respectively. A left branch is traversed when the input element is 0, and a right branch is traversed when it is 1. Examination of the binary tree reveals that only category 1 vectors reach an end node, and that category 0 vectors do not reach an end node.

Figure 2:
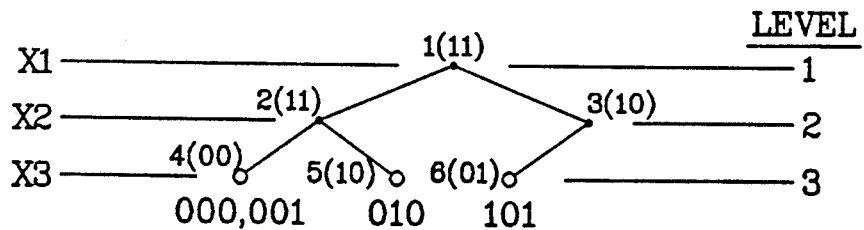
FIG. 2 shows the binary tree of FIG. 1 after pruning.

For pattern recognition purposes, it is required that category 1 vectors produce an output from the tree, and that category 0 vectors do not produce an output. That is, it is required that an input vector be identified as either a category 1 or a category 0 vector. The binary tree of FIG. 1 may be pruned so as to provide for a tree having a smaller number of branch nodes, yet performing the same separation of category 0 vectors from category 1 vectors for pattern classification purposes. Such a pruned tree is shown in FIG. 2, to which figure reference now is made. There, level four end nodes may be deleted from the tree as shown since it is known that all level four nodes comprise end nodes. Also, as seen in FIG. 2, branch node 4 is converted to an end node. With the FIG. 2 binary tree, a 1 output is obtained from end node 4 when either category 1 pattern vector 000 or 001 is supplied to the tree, a 1 output is obtained from branch node 5 when the category 1 pattern vector 010 is supplied to the tree, and a 1 output is obtained from branch node 6 when the category 1 pattern vector 101 is supplied to the tree. The path of category 0 vector 011 is seen to terminate, or break out of the FIG. 2 binary tree at level 3, node 5. Also as seen in FIG. 2, the paths of category 0 vectors 110 and 111 both break out at level 2, node 3 of the tree. Consequently, the category 0 vectors 011, 110 and produce no tree output.

Figure 3:
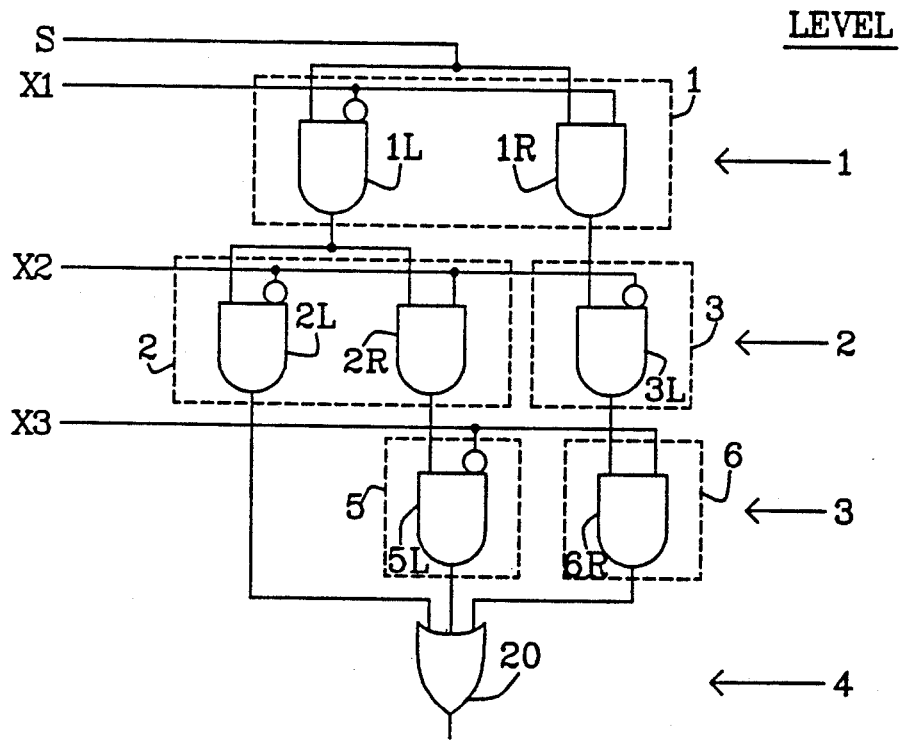
FIG. 3 is an AND and OR gate binary tree network implementation of the binary tree shown in FIG. 2.

Reference now is made to FIG. 3 wherein an AND and OR gate implementation of the binary tree of FIG. 2 is shown. The start and branch nodes are implemented by one or two AND gates, and, collectively, end nodes are implemented by an OR gate. One AND gate for each branch of the tree is required. A start or branch node which branches both left and right requires two AND gates, and those that branch only left or only right require only one AND gate. For example, start node 1 which branches both left and right includes both left and right AND gates 1L and 1R, respectively. Node 3 which branches only to the left, includes only one AND gate 3L. The vector element input signals for left branches are inverted as indicated by the circle at the AND gate inputs.

With the illustrated binary tree of FIG. 3, the pattern vector elements $X_1$, $X_2$ and $X_3$ are supplied as inputs to all of the gates at level 2 and 3, respectively, of the tree. With the inputs in place, a start signal S, is applied to gates of start node 1 to enable the same. If the first element $X_1$ of the pattern vector is a 0, a 1 signal output is produced at the output of gate IL which, in turn, enables gates 2L and 2R at level 2 of the tree. Now, if $X_2$ is a 1, gate 2R produces a 1 signal output which enables gate 5L. Now, if element $X_3$ is a 0, gate 5L produces a 1 output which is supplied to OR gate 20 for production of a 1 output from the OR gate. If, on the other hand, element $X_3$ had been a 1, no output would have been produced by the level 3 AND gate 5L, and, consequently, no output would be produced by the tree. In this manner, category 1 pattern vectors are distinguished from category 0 pattern vectors.

Figure 3A:
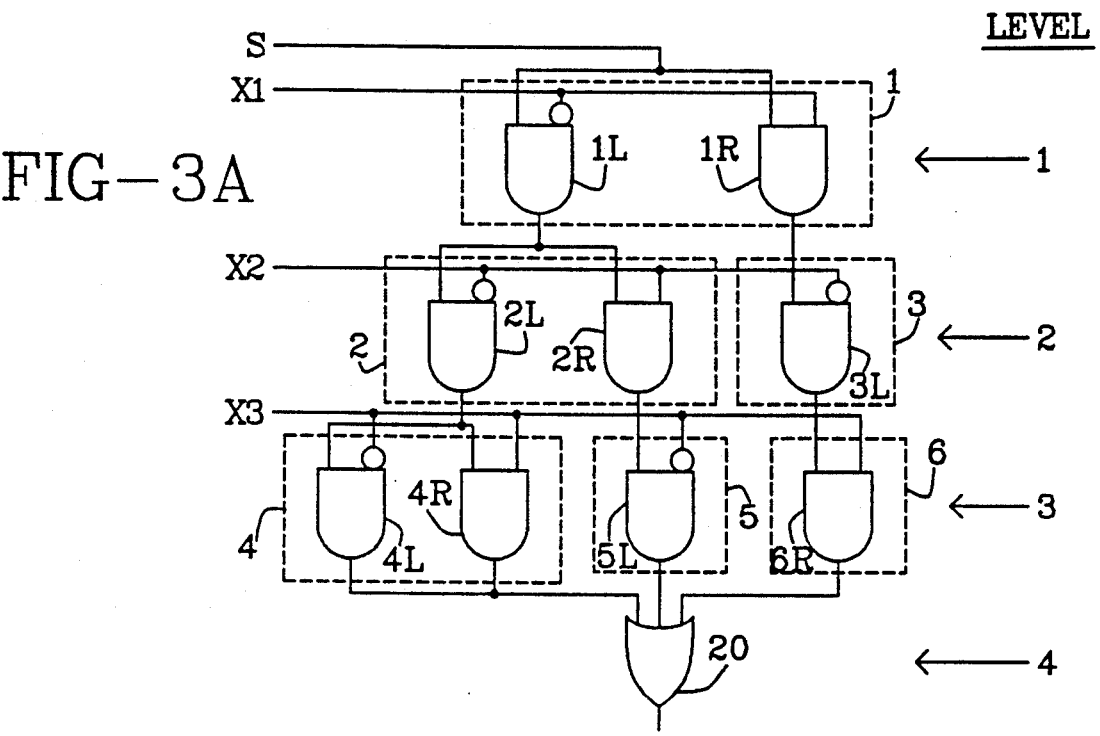
FIG. 3A is similar to that of FIG. 3 but showing an AND and OR gate binary tree network implementation of the unpruned binary tree shown in FIG. 1.

Reference now is made to FIG. 3A wherein an AND and OR gate implementation of the unpruned binary tree of FIG. 1 is shown. The circuit of FIG. 3A differs from that of FIG. 3 by the inclusion of branch node 4 comprising a pair of AND gates to implement both the left and right branch of the node. It is apparent that the hardware implementation of the pruned tree of FIG. 3 is simpler than that of the unpruned tree of FIG. 3A.

Binary Sequence Representation of Binary Tree

The present invention employs a binary sequence of doublets to represent a binary tree. The binary sequence is developed during the binary tree building process using category 0 and category 1 training pattern vectors. Table 1 shows, for purposes of illustration, the node branching indicated by each of the four doublets.

TABLE 1

| Doublet | Node Branch |
|---------|-------------|
| 00 | no branch |
| 10 | branch left |
| 01 | branch right |
| 11 | branch left and right |

Using the meaning of the doublets defined in Table 1, the binary tree of FIG. 1 may be identified by the following binary sequence:

11, 11, 10, 11, 10, 01, 00, 00, 00, 00.

where the nodes 1-10 are identified in sequential order. Similarly, the pruned binary tree of FIG. 2 may be identified by the following binary sequence:

11, 11, 10, 00, 10, and 01.

It here will be noted that doublet separators, such as the commas shown above, are not required and are not employed in use. They are included in the above binary sequences for convenience only for visualizing the sequence of doublets. In FIGS. 1 and 2, doublets identifying the nodes are shown in parenthesis adjacent the node number. Also, the check mark adjacent certain nodes of FIG. 1 indicates that the node has been "activated", for purposes described below.

Reordering of vector elements in such a manner to provide for a tree with the minimum number of nodes now will be described.

Reordering Vector Elements

In accordance with another aspect of this invention, the vector elements of the training pattern vectors are reordered before construction of the binary tree is begun. Obviously, not only are the vector elements of all training pattern vectors reordered, but the vector elements of all vectors to be classified using the resultant binary tree also must be reordered. Reordering of vector elements is done in such a manner as to provide for a binary tree with a reduced number of nodes. When vectors have large dimension and when the training pattern vector sets are large, a large reduction in tree size is provided by optimizing the vector element order. Additionally, optimizing the vector element order allows for use of binary tree pairs in an error correction scheme.

One method of optimizing the vector element order is to determine the total number of 1s at the different vector elements for the entire set of binary training pattern vectors. Then, the vector elements of all pattern vectors are reordered in descending order so that vector element with the greatest number of 1s comprise the first vector element and vector elements with the least number of 1s comprise the last vector element. In the simplified example of training pattern vectors mentioned above, the number of 1s at vector element $x_2$ of the training pattern vector totals 3, and the total number of 1s at each of the vector elements $x_2$ and $x_3$ totals 4. Consequently $x_1$ would be changed to $x_3$, and $x_2$ and $x_3$ may be changed to $x_1$ and $x_2$, respectively.

With these changes, the category 1 and 0 training pattern vectors comprise:

Category 1

$$\begin{pmatrix} 0 \\ 0 \\ 0 \end{pmatrix} \begin{pmatrix} 0 \\ 1 \\ 0 \end{pmatrix} \begin{pmatrix} 0 \\ 1 \\ 1 \end{pmatrix} \text{ and } \begin{pmatrix} 1 \\ 0 \\ 0 \end{pmatrix}$$

Category 0

$$\begin{pmatrix} 1 \\ 1 \\ 0 \end{pmatrix} \begin{pmatrix} 1 \\ 0 \\ 1 \end{pmatrix} \text{ and } \begin{pmatrix} 1 \\ 1 \\ 1 \end{pmatrix}$$

Figure 4:
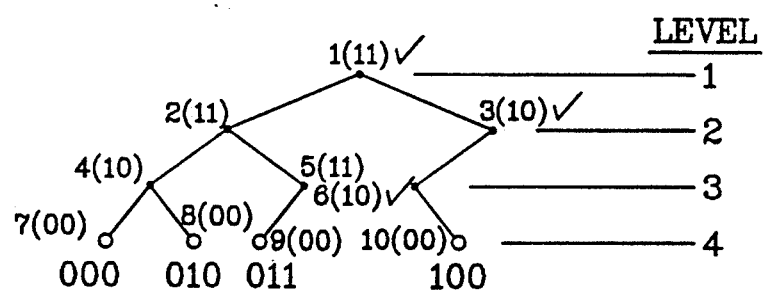
FIGS. 4 and 5 show unpruned and pruned binary trees of the same types shown in FIGS. 1 and 2, respectively, but using training pattern vectors having reordered vector elements in accordance with this invention.
Figure 5:
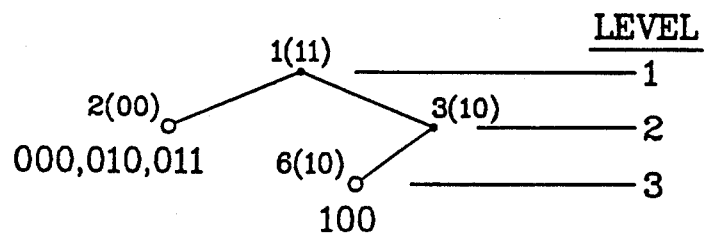
Figure 6:
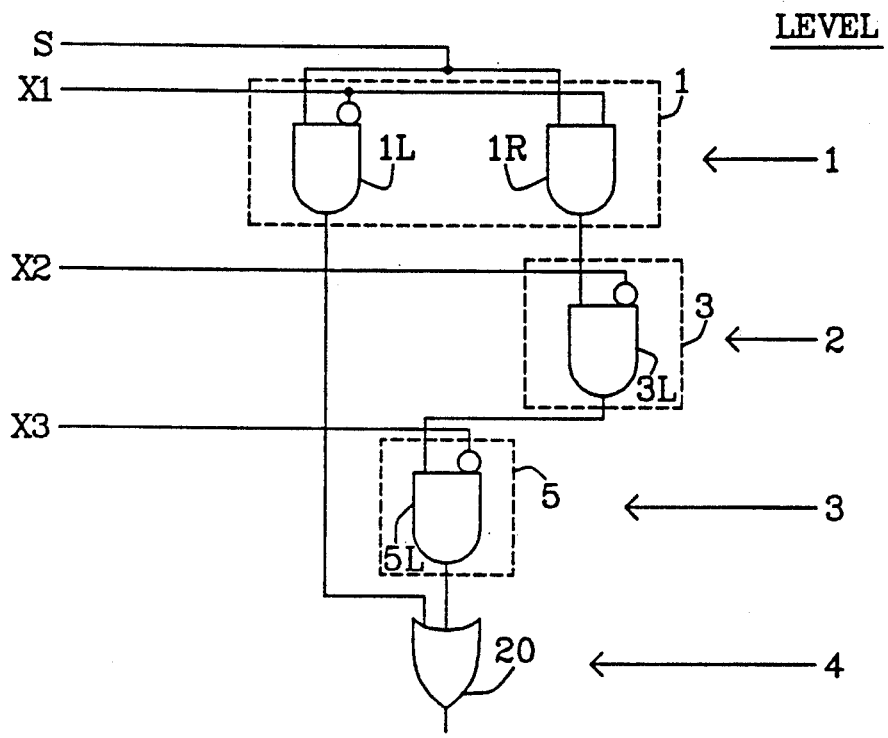
FIG. 6 is an AND and OR gate binary tree network implementation of the pruned binary tree shown in FIG. 5.

Unpruned and pruned binary trees for this set of training pattern vectors are shown in FIGS. 4 and 5, and a hardware implementation of the pruned tree of FIG. 5 is shown in FIG. 6. The simplification of the pruned binary trees which results from reordering of the vector elements is readily apparent by a comparison of FIGS. 5 and 6 with FIGS. 2 and 3, respectively. In practical situations, such reordering results in the production of a binary tree having far fewer nodes than if such reordering was not effected. For example, a practical pattern recognition system for the recognition of the twenty-six letters of the alphabet may include up to 10,000 training vectors for each alphabet letter. Using a 32×32 element array, each vector would include 1024 vector elements. In this example, ordering of vector elements is required for construction of a binary tree having a practical number of nodes. Obviously, if vector elements at one position of both the category and category 0 training vectors are all zeros or all ones, then this element supplies no information concerning the pattern, and may be deleted from both the training vectors and those vectors to be classified.

Other methods of optimizing vector element order are described below in sections entitled Construction of Ordering Vector, 0 and Modified Method of Constructing Ordering vector. 0.

Binary Tree Building Sequence

Figure 7:
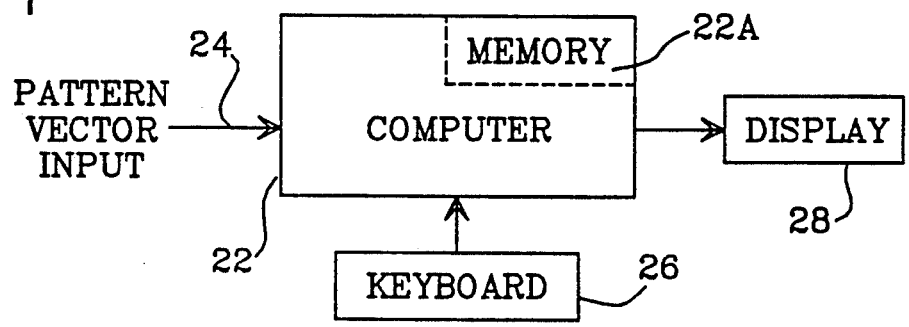
FIG. 7 shows a general purpose digital computer for use in generating a binary tree sequence in accordance with this invention.

Building of a binary tree sequence of this invention may be implemented using a general purpose digital computer, such as computer 22 shown in FIG. 7. Computer 22 includes memory 22A where the binary tree sequence is stored during construction, while training pattern vectors are supplied at input 24. A keyboard 26 is included for control of computer programs and supply of information to the computer. A display unit 28 provides for visual display of computer outputs.

Figure 8B:
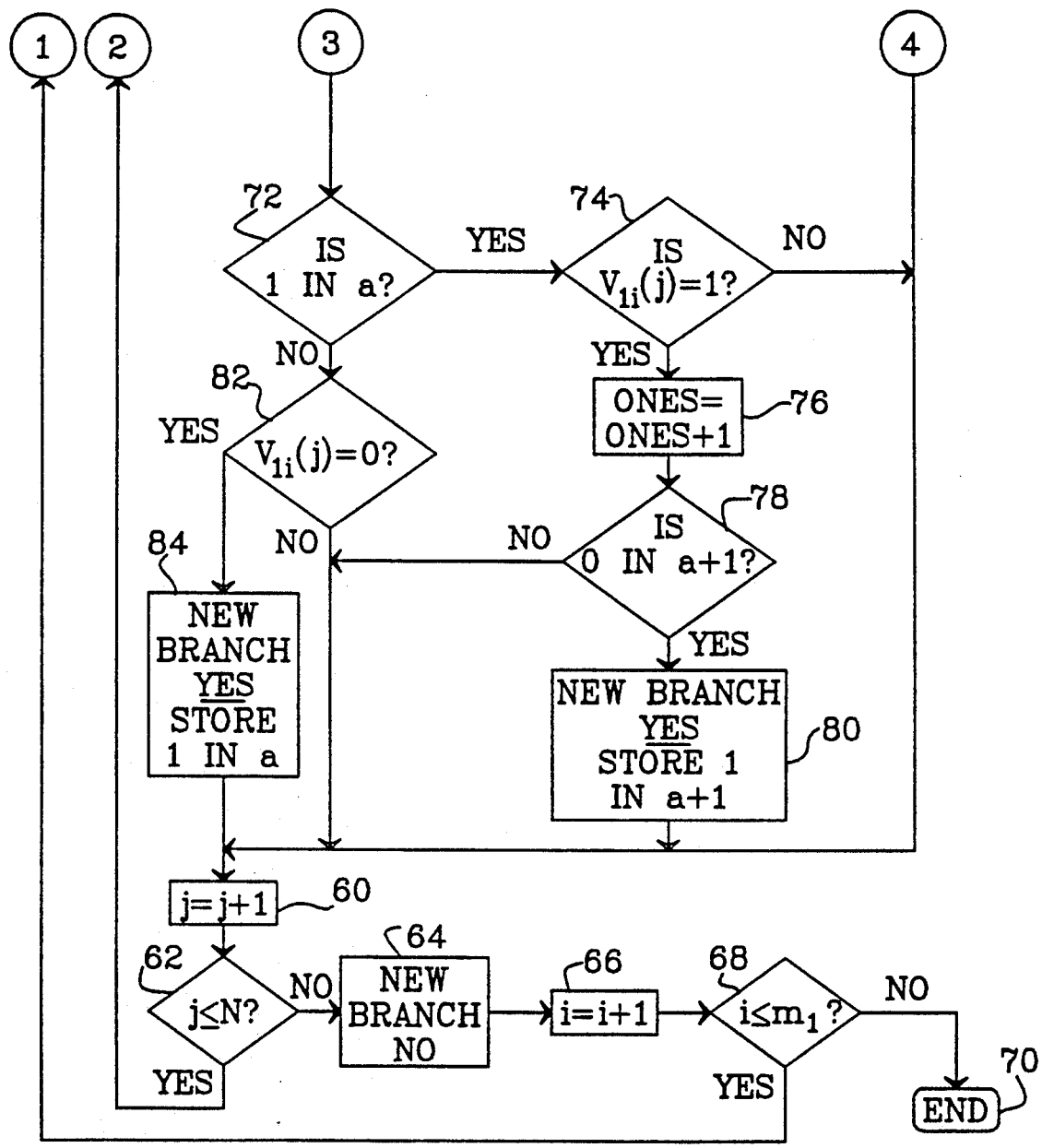
Figure 8C:
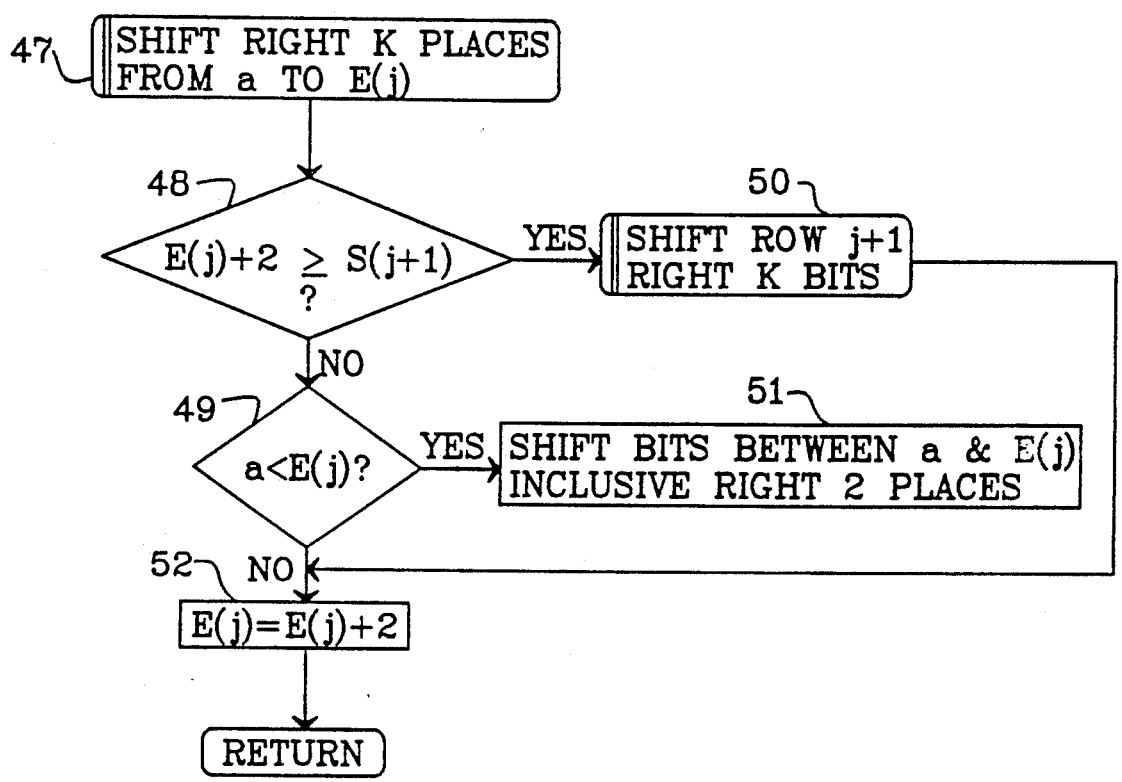

One method of building a binary tree sequence in computer memory of digital computer 22 is shown in the flow diagram of FIGS. 8A, 8B and 8C. In FIG. 8A, to which reference now is made, following START step 30, "order vector elements" step 32, is entered where the vector elements are reordered, as described above, in manners described in detail hereinbelow.

1. Tree Construction

After reordering of the vector elements, step 34 is entered at which time zeros are entered into computer memory 22A where the binary tree sequence is to be constructed. As described above, the binary sequence representative of a binary tree comprises a series of doublets, and a 00 doublet identifies a node having no branches. At step 36, the starting and ending addresses for $j=1$ to N rows, or levels, of the tree are initially set, where N is the number of elements in the pattern vectors. For example, for pattern vectors with 1024 elements, N would equal 1024. The starting $S(j)$ and ending $E(j)$ address, as selected, are shown in the memory chart of FIG. 9. The selection of these starting addresses may be under direct control of the operator. In practical situations, the operator can not know, a priori, how many nodes will be generated at each level of the tree. Therefor, starting and ending addresses are allowed to change during the tree building process. The ending addresses $E(j)$ are initialized at one address lower than the associated starting addresses $S(j) = A(j)$. Also, a "new branch flag" is set to true during initialization step 36.

With the binary tree building method shown in Figs. 8A, 8B and 8C, all of the category 1 training pattern vectors first are presented to the computer, one at a time. Following initialization step 36, a vector number counter is set at step 38 for $i=1$, for counting the number of category 1 training pattern vectors supplied to the computer during the tree building process. There are $m_1$ category 1 vectors, $V_{1i}$, whereby the tree building segment of the binary sequence generating method continues until the vector counter reaches $m_1$. It here will be noted that there are $m_0$ category 0 vectors, $V_{0i}$.

At step 40, a ones counter is set to 0. This counter maintains a count related to the number of 1s in each row, or level, of the binary tree during generation of the binary tree sequence. Next, at step 42, a j counter is set to 1, which counter identifies the vector element being processed. At the beginning of the tree building process, counter 38 starts the loop on the category 1 training pattern vectors, and counter 42 starts the loop on the vector elements. Next, at step 44, an address, "a", is calculated which is equal to the starting address for the row, or level, $S(j)$, plus two times the number of ones as indicated by the ones counter. Address "a" and starting address $S(j)$ are the same at the start of the training process since the ones counter is set to 0 at step 40. Then, at step 45, the ones counter is set equal to the number of ones from the starting address $S(j)$ up to address "a". For this calculation, the contents of the memory at address "a" is not included in the calculation.

To facilitate an understanding of the tree-building process, reference also is made to the memory chart shown in FIG. 9. Memory addresses from 1 through 26 are shown along the top of the chart, together with the ones, i and j counters, and the new branch (NB) flag. The four reordered three-element category training pattern vectors $V_{11}$ through $V_{14}$ are shown at the left side of the chart, and line numbers are provided along the right side thereof. For convenience, starting and ending addresses $S(i)$ and $E(j)$ together with address "a" are included with the memory contents. Line 1, labeled "Initialize" shows conditions following initialization of the system. The starting and ending addresses for the three rows, or levels, 1, 2 and 3 of the tree have been arbitrarily selected at 3 and 2, and 10, and 21 and 20, respectively. At line 1 of FIG. 9 the ones counter is shown initialized at 0, the i and j counters at 1, and the new branch flag is set at Yes, or true.

At decision step 46 (FIG. 8A) the "new branch flag" is checked. In this case, the flag was set true, or yes, at step 36 whereupon "Shift Right K places from a to $E(j)$" sub-routine 47 is entered which sub-routine is shown in FIG. 8C, to which figure reference now is made. At decision step 48 of sub-routine 47 it is determined whether the current ending address $E(j)$ plus 2 is equal to or greater than the starting address of the next level of the tree. With the initial starting and ending addresses, $E(j)+2$ is less than $S(j+1)$ so that decision step 48 is negative and decision step 49 is entered. If decision step 48 had been affirmative, then sub-routine 50 entitled "Shift Row $j+1$ Right K bits" would have been entered for shifting higher level rows to the right to make room for additional nodes at the current row. The shifting of higher level rows of data in computer memory to provide space for additional data at lower level rows is well within the capabilities of one skilled in this art, and details of such a sub-routine are not included herein.

At decision step 49 it is determined whether the current address "a" is smaller than the current ending address $E(j)$. If it is, step 51 is entered where bits contained in storage between "a" and $E(j)$, inclusive, are shifted right two places. Then, at step 52, the ending address $E(j)$ is increased by two. If, at step 49, it is determined that the current address "a" is not smaller than $E(j)$, step 52 is entered directly from step 49. In the present example, at step 49, address "a" is determined not to be less than the current ending address whereupon step 52 is directly entered and the ending address is increased by two. In this case, as seen at line 2 of FIG. 9, the ending address E(1) is shifted from memory location 2 to memory location 4.

Sub-routine 47 ends following step 52 whereupon decision step 54 (FIG. 8A) is entered where it is determined whether the vector element $V_{1i}(j)$ is a zero. If it is, step 56 is entered for storage of a 1 at address "a", indicating a branch left, and if it is a 1, step 58 is entered for storage of a 1 at address "a+1", indicating a branch right. In the present example, wherein the first element of the first training pattern vector is a 0, a 1 is stored at address "a" as seen at line 2 of FIG. 9.

From steps 56 and 58, step 60 (FIG. 8B) is entered where the j counter is incremented by one. Next, at step 62, it is determined whether j is equal to or less than N where, as noted above, N is the number of vector elements $X_i$ in the training vectors. In the present example, wherein the training vectors include three vector elements, step 62 is affirmative and step 44 is re-entered for processing the second vector element of the first pattern training vector $V_{11}$.

During this loop on the second vector element of the first pattern training vector, ending address E(2) is changed from memory location 10 to location 12 (step 52 of FIG. 8C), 1 is entered at address "a" at memory location 11 (step 56 of FIG. 8A) and the j counter is incremented to 3 (step 60 of FIG. 8B) as shown at line 3 of FIG. 9.

On the next pass, or loop, during processing of the third element of the first training pattern vector $V_{11}$, ending address E(3) is changed from memory location 20 to 22, and a 1 is entered at address "a" at memory location 21. The j counter is incremented to 4 at step 60 whereupon the decision at the following step 62 is negative and step 64 is entered where the new branch flag is set to false, or no. Then, at step 66, the i counter is incremented by one, and decision step 68 is entered where it is determined whether i equals or is less than $m_1$, the number of category 1 training pattern vectors. When all the category 1 training pattern vectors have been processed, step 68 is negative and end step 70 is entered. If more category 1 training pattern vectors are to be processed, decision step 68 is affirmative, and step 40 is re-entered.

In the present example, processing of the second training pattern vector $V_{12}$ now begins. (See also line 5 of FIG. 9.) At step 40 the ones counter is set to 0, and at step 42 the j counter is set to 1. At step 44 address "a" is set equal to S(1)+2x ones, and with the ones counter set to 0 at step 40, address "a" equals S(1), at memory location 3. Next, at step 45, the ones counter is set equal to the number of 1s between "a" and S(1) which, in this case is 0.

When decision step 46 is entered while processing the first element of vector $V_{12}$, the decision is negative, the new branch flag having been set false, or no, at step 64, whereupon step 72 is entered where it is determined whether a 1 is stored at address "a". A 1 was stored at address "a" while processing the first training pattern vector, so decision step 72 is affirmative, and decision step 74 is entered. At step 74 it is determined whether $V_{12}(1)$ is a 1. In this example, the first element of the second category 1 training pattern vector is a zero whereby decision step 74 is negative, and step 60 is entered directly.

The second element of the second category 1 training pattern vector $V_{12}$ is a 1, which requires the addition of a second 1 to the node identified by the doublet at and right. When decision step 74 is reached while processing the second element of the second training pattern vector, the result is affirmative since the vector element is a 1, whereupon step 76 is entered. At step 76, the ones counter is incremented by 1, after which decision step 78 is entered where it is determined whether a 0 is in address "a+1". If there already is a 1 at address "a+1", the decision is negative, and step 60 is entered. In the present situation, there is a 0 at address "a+1" whereby the decision is affirmative, and step 80 is entered. At step 80, the new branch flag is set to true, or yes, and a 1 is stored at address "a+1", here memory location 12, as shown at line 6 of FIG. 9. From step 80, step 60 is entered. The following decision step 62 is affirmative whereby step 44 is entered in preparation of processing the third element of the second training pattern vector.

When step 44 is entered for processing the third element of the second training pattern vector $V_{12}$, the number of ones equals 1 whereby "a" is determined to be S(j)+2 (i.e. address 23. See also line 7 of FIG. 9.) Then, at step 45 the number of ones from S(j) up to "a" is determined to be one. Next, decision step 46 is determined to be affirmative whereupon sub-routine 47 is entered. At decision step 48 it is determined that the ending address E(3)+2 is not equal to or greater than the starting address for the next row (there being no next row) whereupon decision step 49 is entered. Decision step 49 is negative since "a" is not less than E(3) whereupon step 52 is entered, and ending address E(3) is incremented by two, to address 24.

From sub-routine 47, decision step 54 is entered (FIG. 8A) where it is determined that the third element of the second training pattern vector $V_{12}$ is a zero. Consequently, step 56 is entered whereupon a 1 is stored at address a, here address 23. Step 60 then is entered where the ]counter is incremented by one. At step 62, it is determined that j is no longer equal to or less than N whereupon steps 64, 66 and 68 are transversed, and operation is returned to step 40 for processing of the third training pattern vector $V_{14}$.

During processing of the first and second vector elements of the third training pattern vector (lines 8 and 9 of FIG. 9) no branches are added to the binary tree contained in memory. The third element of the third category 1 training pattern vector is a 1, which requires the addition of a second 1 to the node identified by the doublet at memory locations 23 and 24 to signify branching both left and right. (See line 10 of FIG. 9.) At step 44, address "a" is determined to be S(3)+2, at memory address 23. Then, at step 45, the number of 1s from S(3) up to "a" is determined to be 1. Decision step 46 is negative whereupon decision step 72 is entered where it is determined that a 1 is located at address "a". Decision step 74 therefore is entered where it is determined that vector element $V_{13}(3)$ is a 1, whereupon step 76 is entered for addition of 1 to the ones counter. At step 78 it is determined that address "a+1" contains a zero whereupon step 80 is entered where new branch flag is set to yes, and a 1 is stored at address "a+1". The j counter is incremented by 1 at step 60, whereupon decision step 62 is negative and operation transfers to step 64 where the new branch flag is set to no. At step 66, the i counter is incremented from 3 to 4, and since decision step 68 is affirmative, operation loops back to step 40 for processing of the fourth training pattern vector $V_{14}$.

In the set of category 1 training pattern vectors, it will be noted that the fourth training pattern vector $V_{14}$ is the first vector to include a as the first vector element. This, then, requires that the doublet at memory locations 3 and 4 include a second 1 to indicate both left and right branching. (See line 11 of FIG. 9.) In processing this vector element, the ones and j counters are set to 0 and 1 at steps 40 and 42, respectively, and address "a" is determined to be S(1) at step 44. The new branch flag having been set to no at step 64, step 46 is negative and decision step 72 is entered which is determined to be affirmative. The next step 74 also is affirmative whereupon one is added to the ones counter at step 76. Next, decision step 78 is affirmative since there is a zero at address "a+1". Consequently, step 80 is entered where the new branch flag is set to yes and a 1 is stored at address "a+1". Operation then cycles back through steps 60 and 62 to step 44 in preparation of processing the second element of the fourth category 1 training pattern vector.

At step 44 "a" is set equal to S(2)+2, which is address 13, and at step 46 the number of ones is determined to equal two. (See also line 12 of FIG. 9.) With the new branch flag set to yes, step 46 is affirmative whereupon sub-routine 47 is entered. Next, at decision step 48 of sub-routine 47 it is determined that E(2)+2 (namely 14) is less than address S(3) (namely 21) whereby decision step 48 is negative, and decision step 49 is entered. At decision step 49 it is determined that address "a" (namely 13) is not less than ending address E(2) (namely 12). Consequently, decision step 49 is negative whereupon step 52 is entered for changing the ending address from E(2) to E(2)+2.

From sub-routine 47, decision step 54 is entered where it is determined that vector element 2 of training pattern vector $V_{14}$ is a zero. As a result of this determination, a 1 is stored at address "a". Operation then proceeds through steps 60 and 62 back to step 44 for processing of the final vector element $V_{14}(3)$. At step 44, address "a" is calculated as $S(3)+(2\times 2)$, which is address 25. (See line 13 of FIG. 9.) Then, at step 45 the number of ones from S(3) to "a" is determined to be 3. The new branch flag remains set whereby decision step 46 is affirmative whereupon sub-routine 47 again is entered. There, at step 48, it is determined that E(3) +2 (namely 26) is not equal to or greater than the start of the next row, there being no next row. Consequently, decision step 48 is negative and step 49 is entered. At step 49 it is determined that address "a" (namely 25) is not less than ending address E(3) (namely 24) whereupon step 52 is entered directly. At step 52 ending address E(3) is increased by two, to address 26. At decision step 54 it is determined that the third vector element of training pattern vector $V_{14}$ is a zero whereupon step 56 is entered for storage of a at address "a". Operation proceeds through steps 60, 62, 64 and 66 to step 68 where it is determined that i no longer is equal to or less than m:. Since the decision is negative, operation stops at end 70. The resultant binary sequence which is constructed using the illustrated category 1 training pattern vectors is illustrated at line 13 of FIG. 9.

2. Binary Sequence Consolidation

Figure 10:
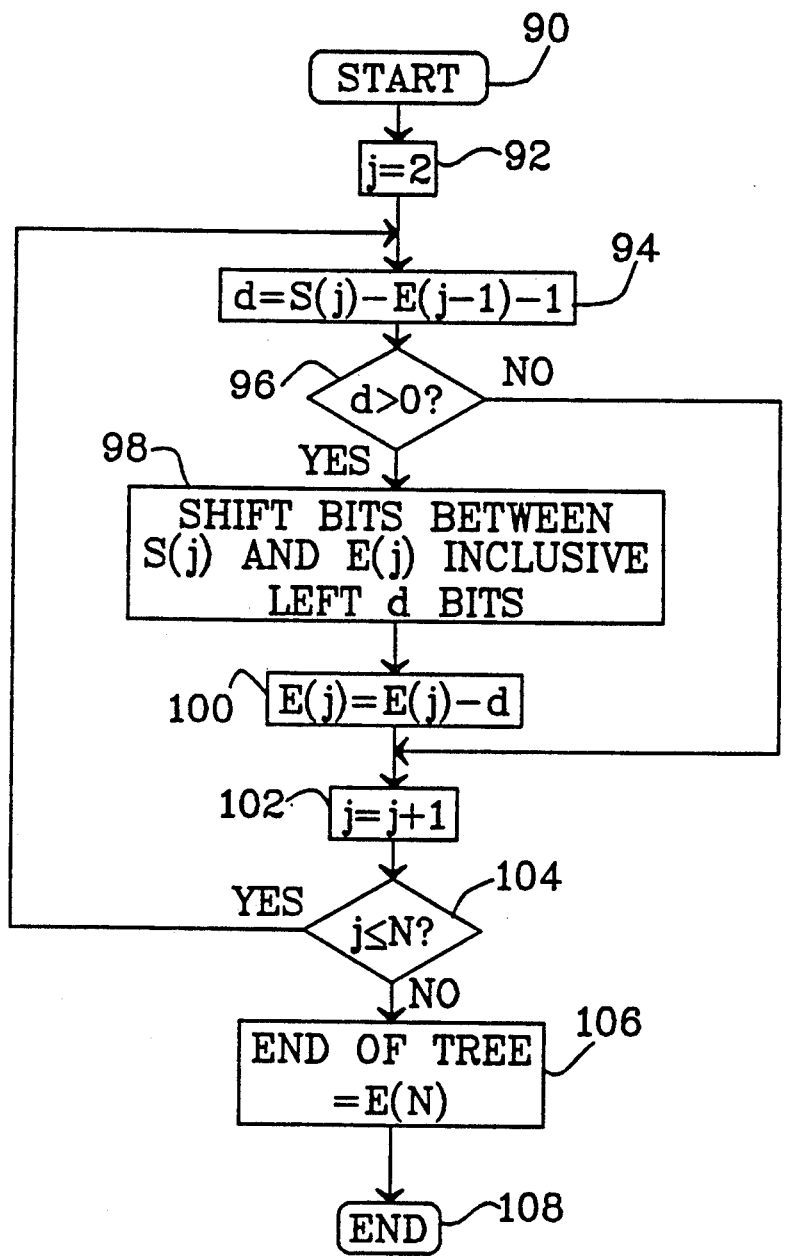
FIG. 10 is a flow diagram showing steps included in consolidating the unpruned binary tree sequence.

The binary tree sequence shown at line 13 of FIG. 9 includes gaps between the ending address of one row and the beginning address of the next row, or level, of the binary tree, which gaps are deleted using a consolidation operation shown in the flow chart of FIG. 10, to which figure reference now is made. Following start step 90, a j counter is initialized at 2 at step 92. Then, at step 94 a difference value, d, is calculated where d=S(j) −E(j−1) −1. Where j=2, S(j) is the starting address of the second level of doublets, and E(j−1) is the ending address of the first level of doublets. At line 13 of FIG. 9, E(1) is at memory location 4 and S(2) is at memory location 11, whereby d=11−4−1=6.

At decision step 96 it is determined whether d is greater than 0. In this case, the decision is affirmative whereupon step 98 is entered for shifting of bits between S(2) and E(2), inclusive, left d bits. Here, bits between memory locations 11 and 14 are moved left six bits. Then, at step 100, the ending address E(2) is decremented by d. At step 102, the j counter is increased by 1, after which decision step 104 is entered.

At decision step 104, if j is equal to or less than N, where N is the number of elements in the training pattern vectors, step 94 is reentered for consolidation of the next level of bits. In this case both j and N equal 3 whereby the consolidation process is repeated. Now, S(3) equals 21 and E(2) equals 8 whereby d equals 21−8−1=12. Since d is larger than 0, step 98 is entered from decision step 96, and the third level of doublets is shifted left 12 bits. Now at step 100 the ending address E(3) is reduced by 12. Next, at step 102 j is incremented by 1 and now equals 4. At decision step 104, it is determined that j no longer is equal to or less than N whereupon step 106 is entered. At step 106 the ending address of the binary tree sequence is set equal to E(N), which, in the above example, is memory location 14, and the consolidation process ends at step 108.

The resultant consolidated tree of binary doublets is shown at line 14 of FIG. 9. As noted above, the binary doublet tree at line 14 of FIG. 9 completely identifies the binary tree shown in FIG. 4. End, or leaf, nodes at level 4 of the binary tree shown in FIG. 4 are not included in the binary sequence since branches identified at level 3 of the binary tree lead to leaf nodes.

3. Binary Tree Pruning

The binary tree sequence constructed in the above-described manner may be employed to classify unknown vectors, or as the basis for a hardware tree for classifying vectors. However, as a practical matter, it is highly desirable to prune the tree before use so as to reduce the number of nodes required for operation of the tree for vector classification, in either hardware or software. The novel tree pruning method of this invention involves using the category 0 vectors to "activate" nodes of the binary tree sequence. Then, after nodes have been activated, actual pruning, or removal, of non-required nodes from the tree begins.

A. Activation of Nodes

Figure 11:
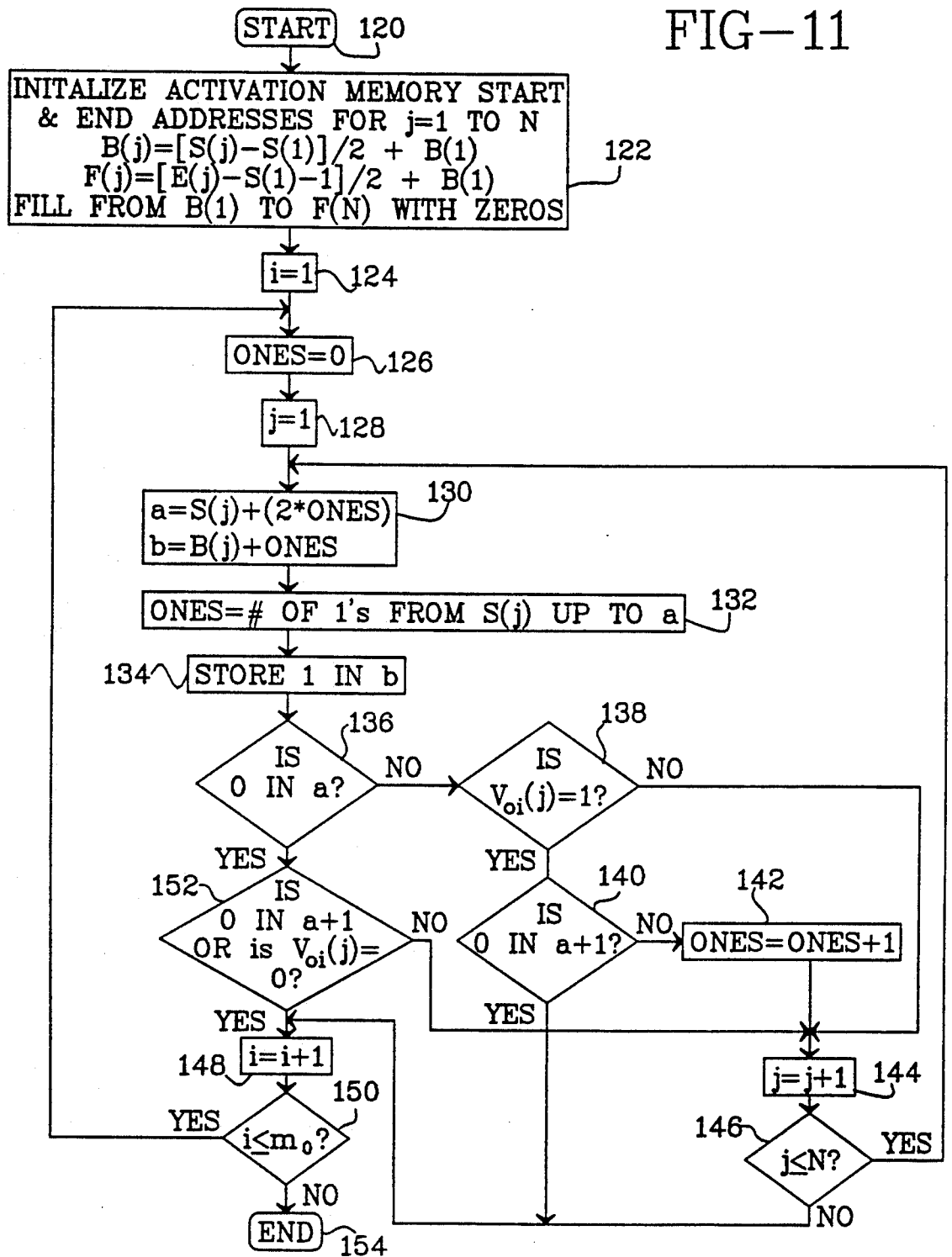
FIG. 11 is a flow diagram showing steps for actuating nodes of the binary tree in preparation for pruning the tree.

Reference is made to the flow diagram of FIG. 11 and memory chart of FIG. 12 which will facilitate an understanding of the node activation process. In FIG. 12, the contents of the binary tree sequence memory is shown at line beneath the address heading, which contents correspond to that shown at line 14 of FIG. 9. The starting and ending addresses S(j) and E(j) for the three levels of the tree are shown along with the tree memory contents. The contents of a second memory, identified as an activation memory, are shown beneath the tree memory contents. The activation memory is located apart from the binary tree sequence memory, and is only one-half the size of the binary tree sequence memory, there being one memory address for each node of the binary tree sequence. The activation memory contents simply identify those binary tree nodes which are traversed by a category 0 training pattern vector. A 1 in the activation memory indicates that the node is activated by passage of a category 0 training pattern vector therethrough, and a 0 indicates that the node is inactivated.

In FIG. 11, after start step 120, initialization step 122 is entered where starting, B(j), and ending, F(j), addresses for the different levels of the activation memory are calculated. The starting addresses are:

$$B(j) = [S(j) - S(1)]/2 + B(1)$$

and the ending addresses are:

$$F(j) = [E(j) - S(1) - 1]/2 + B(1).$$

The tree memory and activation memory starting addresses S(1) and B(1), respectively, are shown at memory locations 3 of the respective tree and activation memories. The starting and ending address B(j) and F(j), respectively, for the three different levels of the activation memory are shown at line 2 of FIG. 12. There, B(1), B(2), and B(3) are shown at activation memory addresses 3, 4, and 6, respectively, and F(1), F(2), and F(3) are shown at addresses 3, 5, and 8, respectively. Also, at initialization step 122, the activation memory is filled with zeros.

Following initialization, step 124 is entered where a 1 is entered in the i counter. Then, at step 126, the ones counter is loaded with a zero, after which, at step 128, the j counter is loaded with a 1. Next, at step 130 addresses "a" and "b" are computed, where address "a" is an address for the binary tree memory, and address "b" is an address for the activation memory. As seen at step 130, these addresses are determined as follows:

$$a = S(j) + 2 \times ONES, \text{ and}$$

$$b = B(j) + ONES.$$

In FIG. 12, both addresses "a" and "b" are shown in the activation memory chart, even though address "a" identifies a binary tree memory address. For the first element of the category 0 training pattern vector, addresses "a" and "b" are determined to be 3 at step 130.

At step 132, the ones counter is set equal to the number of ones from starting address S(j) up to address "a". As with step 45 shown in FIG. 8A, for this calculation the contents of the binary tree memory at address "a" is not included in the calculation. Therefore, at this point in the operation, the ones are determined to equal 0 at step 132. At step 134 a 1 is stored at address "b" of the activation memory, here at memory address 3, as shown at line 3 of FIG. 12, to indicate activation of the first node (node 1) of the binary tree shown in FIG. 4. A check mark adjacent node 1 in FIG. 4 indicates activation thereof.

Next, at decision step 136, it is determined whether a 0 is in address "a" of the tree memory. As seen at line 1 of FIG. 12, a 1 is at address "a" whereby step 136 is negative, and decision step 138 is entered. There, it is determined whether $V_{0i}(j)$ equals 1. As seen at line 3 of FIG. 12, $V_{0i}(1)$ is 1 whereby decision step 138 is affirmative, and step 140 is entered where it is determined that there is not a zero at tree memory address "a+1". Since step 140 is negative, step 142 is entered where 1 is added to the ones counter. Then, at step 144, a 1 is added to the j counter. From step 144, decision step 146 is entered where it is determined whether j equals or is less than N, where N, as noted above, is the number of elements in the training pattern vectors. In the present example, N equals 3, whereby decision step 146 is affirmative, and step 130 is reentered.

For vector element 2 (line 4 of FIG. 12) "a" is determined to be tree memory address 5+2=7, and "b" is determined to be activation memory address 4+1=5. Then, at step 132, the number of ones from S(2), at memory address 5, up to "a" at memory address 7, is determined to be 2. A 1 then is stored at activation memory address 5, in accordance with step 134, which indicates that node 3 is activated. (See also FIG. 4.) Now, decision step 136 is negative since there is a 1 at address "a" whereupon decision step 138 is entered. Again, decision step 138 is affirmative whereupon decision step 140 is reentered where it is determined whether there is a 0 at "a+1". Address "a+1" equals tree memory address 8 and, as seen at line 1 of FIG. 12, memory address 8 contains a 0. As a result, decision step 140 is affirmative, whereupon step 148 is entered where the i counter is incremented by 1 to 2. From step 148, step 150 is entered where it is determined if there are additional category 0 training pattern vectors to be processed. Since there are, step 150 is affirmative, and step 126 is reentered in preparation for processing the second category 0 training pattern vector.

As seen at line 6 of FIG. 12, the ones counter is set to 0 (step 126) the j counter is set to 1 (step 128) and the "a" and "b" addresses are determined to be 3 (step 130). The number of ones from S(1) to "a" equals 0 (step 132). At step 134, a 1 is entered at activation memory address "b". However, since address "b" already contains a there is no change of content at this address. Steps 136, 138, 140, 142, 144 and 146 are followed back to step 130, for processing of the second element of the second category 0 training pattern vector.

The "a" and "b" addresses, and contents of the ones counter are as indicated at line 7 of FIG. 12, as determined at steps 130 and 132. At step 134, a 1 is stored at activation memory address "b". (Again, a 1 was stored at address "b" when processing the first category 0 training pattern vector.) Next, decision steps 136 and 138 are negative, whereupon step 144 is entered to increment the j counter to 3. Decision step 146 is affirmative whereupon operation loops back to step 130 for processing the third element of the second category 0 training pattern vector.

At step 130 the "a" address is determined to be 9+4=13 and the "b" address is determined to be 6+2=8. (See line 8 of FIG. 12.) At step 132, the number of 1s from S(3) up to "a" is determined to be 3. Then, at step 134, a 1 is stored at activation memory location 8. The program then continues through steps 136, 138, and 140 to step 148 where the i counter is incremented by 1 to 3. Decision step 15 is affirmative whereupon the program loops back to step 126 for processing the final category 0 training pattern vector $V_{03}$.

As seen at lines 9, 10, and 11 of FIG. 12, there is no change in the activation of nodes during processing of the first, second and third elements of the third, and final category 0 training pattern vector. The contents of the activation memory are illustrated at line 11 of FIG. 12, and starting and ending address B(j) and F(j) for the different rows are shown both at line 2 and line 12. With the illustrated combination of category 1 and category 0 training pattern vectors, node activation memory contains ones at the first, third and sixth memory locations (here addresses 3, 5 and 8) thereby identifying the first, third and sixth nodes of the binary tree shown in FIG. 4 as activated nodes. As noted above, these nodes are identified by a check mark adjacent thereto. Once the activated nodes are identified, actual pruning of the tree may begin.

B. Tree Pruning

Figure 13:
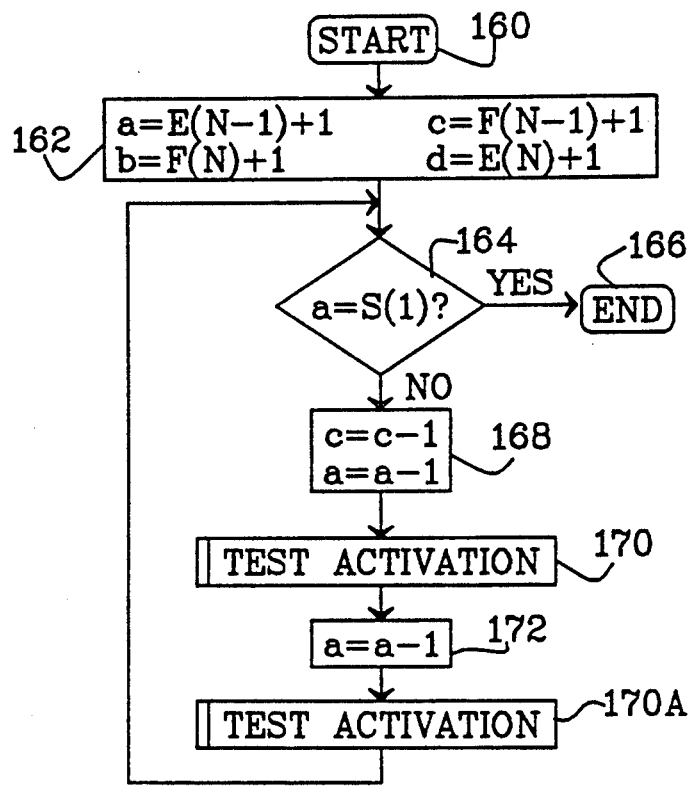
FIG. 13 and 14 are flow diagrams showing steps for pruning nodes from the binary tree sequence.

The binary tree pruning process, using the node activation information obtained as described above, now will be described with reference to the flow diagrams of FIGS. 13 and 14 and the chart of FIG. 15. In FIG. 13, following start step 160, addresses a, b, c and d are calculated as follows:

$a = E(N-1) + 1$ $b = F(N) + 1$ $c = F(N-1) + 1$ and $d = E(N) + 1$ where E(N) and F(N) are the ending addresses of the binary tree memory and activation memory, respectively. The contents of these memories are shown at line 1 of FIG. 15, and the addresses a, b, c, and d calculated at step 162 are shown at line 2 thereof. The calculations are based upon activation memory finishing addresses F(2)=5 and F(3)=8, and binary tree ending addresses E(2)=8 and E(3)=14, which addresses are identified at lines 1 and 2 of FIG. 12 described above. The calculated values for the binary tree memory are; a=9 and d=15, and those for the activation memory are b=9 and c=6. At decision step 164 it is determined whether address "a" equals the starting address, S(1), of the binary tree memory. If it does, tree pruning ends at step 166. If not, step 168 is entered where the "a" and "c" addresses are decremented by 1. (Line 3 of FIG. 15.) Then, step 170 is entered where activation of the binary tree nodes is tested.

Figure 14:
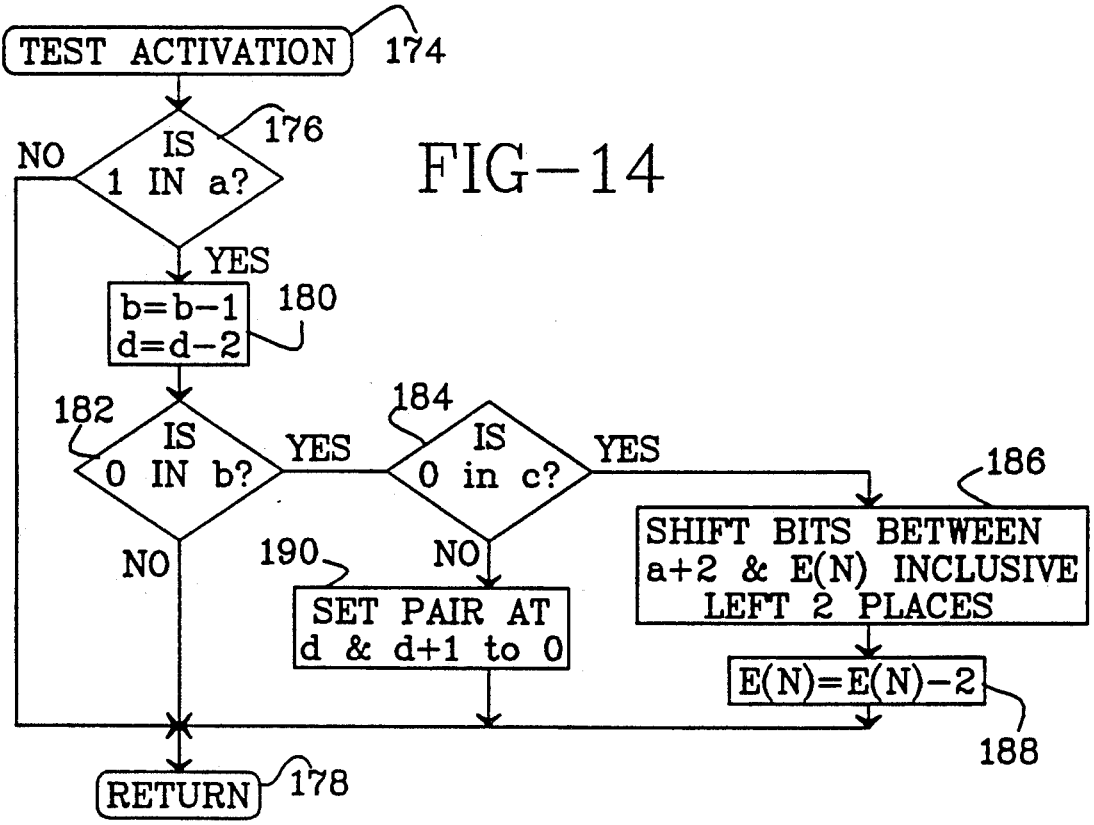

The "test activation" step comprises a subroutine shown in FIG. 14. At decision step 176 it is determined whether there is a 1 at address "a". If not, return step 178 of the test activation subroutine is directly entered. Here, as shown at line 3 of FIG. 15, address "a" contains a 0 whereby decision step 176 is negative and the test activation ends at step 178. From step 170 of FIG. 13, step 172 is entered where the "a" address is decremented by 1, after which test activation step 170A is entered. (See line 4 of FIG. 15.) It here will be noted that test activation sub-routines 170 and 170A shown in FIG. 13 are identical; the actual test activation sub-routine being shown in FIG. 14. However, in FIG. 13 one sub-routine has been provided with the suffix A to facilitate the description of the tree pruning process. As seen at line 4 of FIG. 15, the binary tree sequence contains a 1 at address "a" such that decision step 176 of sub-routine 170A is affirmative whereupon step 180 is entered. At step 180 the "b" address is decremented by and the "d" address is decremented by 2. (See line 5 of FIG. 15.)

From step 180, decision step 182 is entered where it is determined whether there is a 0 at address "b" of the activation memory. In this case the decision is negative whereupon the test activation sub-routine (170A) is exited, and decision step 164 is reentered. Decision step 164 is negative whereupon step 168 is entered where the "a" and "c" addresses are decremented by 1. (See line 6 of FIG. 15.) Then, decision step 176 of the test activation sub-routine 170 is determined to be affirmative whereupon step 180 is entered where the "b" address is decremented by 1 and the "d" address is decremented by 2. (See line 7 of FIG. 5.) Decision step 182 now is affirmative since a 0 is located at address "b" whereupon decision step 184 is entered. Decision step 184 also is affirmative whereupon step 186 is entered. At step 186 binary tree memory bits between "d+2" and E(N) are shifted two places to the left thereby deleting from the tree the binary doublet at addresses "d" and "d+1" Then, at step 188, ending address E(N) is decremented by 2. The resultant binary tree is shown at line 8 of FIG. 15.

The test activation sub-routine 170 is now ended and operation returns to step 172 where the "a" address is decremented by one. (See line 9 of FIG. 15.) Test activation sub-routine 170A is again entered where, at step 180 the "b" address is decremented by 1 and the "d" address is decremented by 2 as shown at line 10 of FIG. 15. Next, both decision steps 182 and 184 are affirmative, there being a 0 at both address "b" and at address "c", whereupon step 186 again is entered for shifting bits between d+2 and E(N) two places to the left, thereby eliminating from the binary tree the binary doublet that was located at memory locations 9 and 10. Then at step 188 the ending address E(N) is decremented by 2. The resultant binary tree is shown at line 11 of FIG. 15.

Operation now returns to decision step 164 which, again, is negative whereby step 168 is entered whereupon both the "a" and "c" addresses are decremented by 1, as shown at line 12 of FIG. 15. Now, during the test activation sub-routine 170, decision step 176 is affirmative whereby step 180 is entered whereupon the "b" address is decremented by 1 and the "d" address is decremented by 2, as shown at line 13 of FIG. 15. Next, at decision step 182 it is determined that there is no 0 at address "b" whereby step 182 is negative and subroutine 170 is ended.

Step 172 is entered from subroutine 170 where address "a" is decremented by 1 as shown at line 14 of FIG. 15. Sub-routine 170A again is entered where, at decision step 176, it is determined that there is a 1 at address "a" whereupon the step is affirmative and step 180 is entered. At step 180, the "b" address is decremented by 1 and the "d" address by 2, as shown at line 15 of FIG. 15. There is a 0 at address "b" whereby decision step 182 is affirmative. However, there is no 0 at address "c" whereupon decision step 184 is negative. From decision step 184, step 190 is entered where the doublet at addresses "d" and "d+1" is changed from 11 to 00 as shown at line 16 of FIG. 15.

From sub-routine 170A, decision step 164 is entered where it is determined that address "a" equals starting address S(1). Decision step 164 now is affirmative whereupon end step 166 is entered to terminate the tree pruning process. The sequence of binary doublets shown at line 16 of FIG. 15 completely defines the pruned binary tree shown at FIG. 5 of the drawings.

4. Noisy Training Set

If the training set of vectors is "noisy", the number of nodes in the binary tree can be reduced by removal of paths which are due to outliers. During the binary tree construction process, the number of times a category 1 path and the number of times a category 0 path passes through each node of the tree is recorded. Then, during the tree pruning process, a node is checked as "activated" only if the ratio of category 0 to category 1 paths at that node is greater than a threshold. (This differs from the above-described method wherein a node is checked as activated when it is included in a category 0 path.) Then, if a node is checked, but the percentage of category 1 paths that branched to that node from a higher level node is below a threshold, the check is removed. Following this modified form of activating nodes, tree pruning proceeds as described above. This is an effective procedure for removing outlying nodes and here is termed "branching by probabilities". In brief, with probability branching, a node is activated only when the measured category 0 probability at a node rises above a threshold. Similarly, a branch, say, to the right is added only when the measured probability of category 1 training vectors that require a branch from the node to the right exceeds a threshold.

With the probability branching method of binary tree construction, it will be apparent that the resultant tree when used for classifying vectors may produce an erroneous result. For example, a category 0 vector may reach an end point, or leaf node, of the tree, and a category vector may not reach such an end point. However, the probability of error in vector classification is dependent upon the thresholds employed in generating and pruning the tree, and may be made small by use of small thresholds. By using probability branching, frequently the tree size can be substantially reduced.

Classifying Vectors

Figure 16:
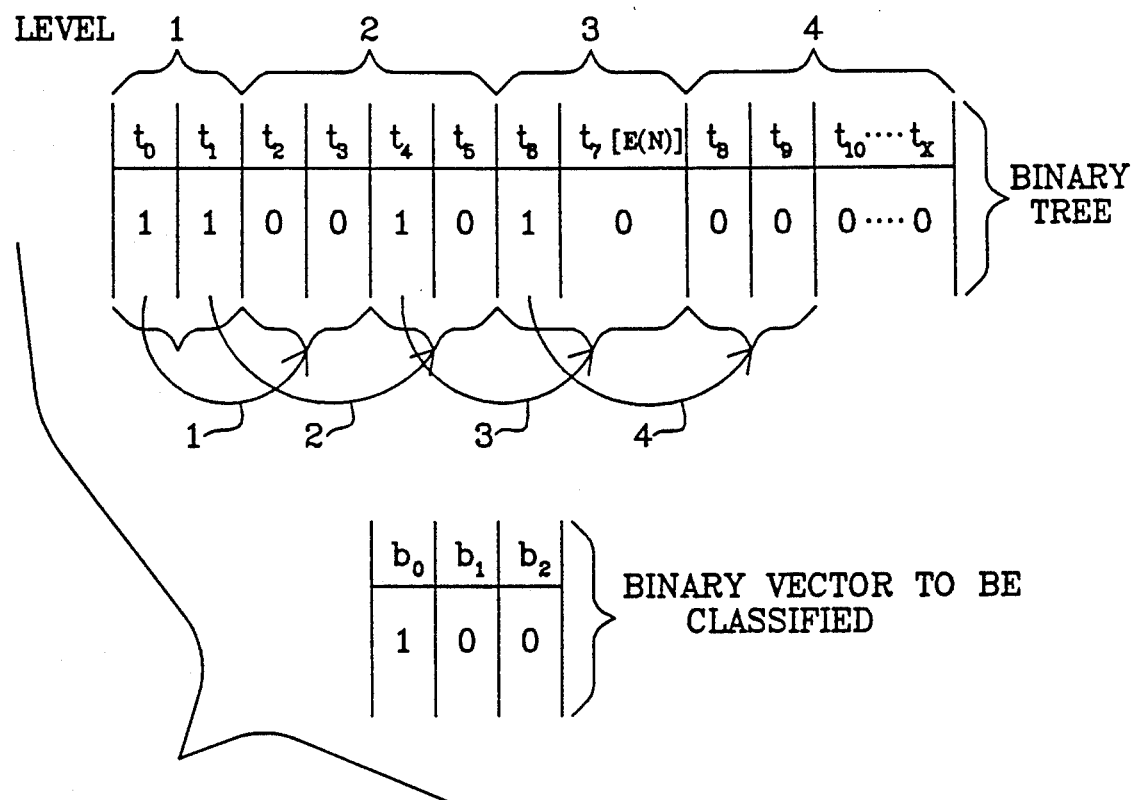
FIG. 16 shows a binary tree, in binary doublet form, together with a binary vector to be classified using the tree.

Either the unpruned or the pruned binary tree sequence may be used in a digital computer for classification of vectors. A general purpose digital computer of the type shown in FIG. 7 may be used for this purpose. For purposes of illustration, the pruned binary tree sequence, such as the sequence shown at line 16 of FIG. 15, i.e. 11001010, may be stored in computer memory 22A. As described above, this is the tree illustrated in FIG. 5, and a hardware version of the tree is illustrated in FIG. 6. The pattern vector to be classified is supplied as an input to the computer at line 24. Both the binary tree sequence and the binary pattern vector to be classified are shown in FIG. 16. A flow chart showing computer operation for pattern vector classification is shown in FIGS. 17A and 17B, and a chart showing the contents of various registers and flags for use in illustrating the vector classification processing is shown in FIGS. 18A and 18B.

Figure 17A:
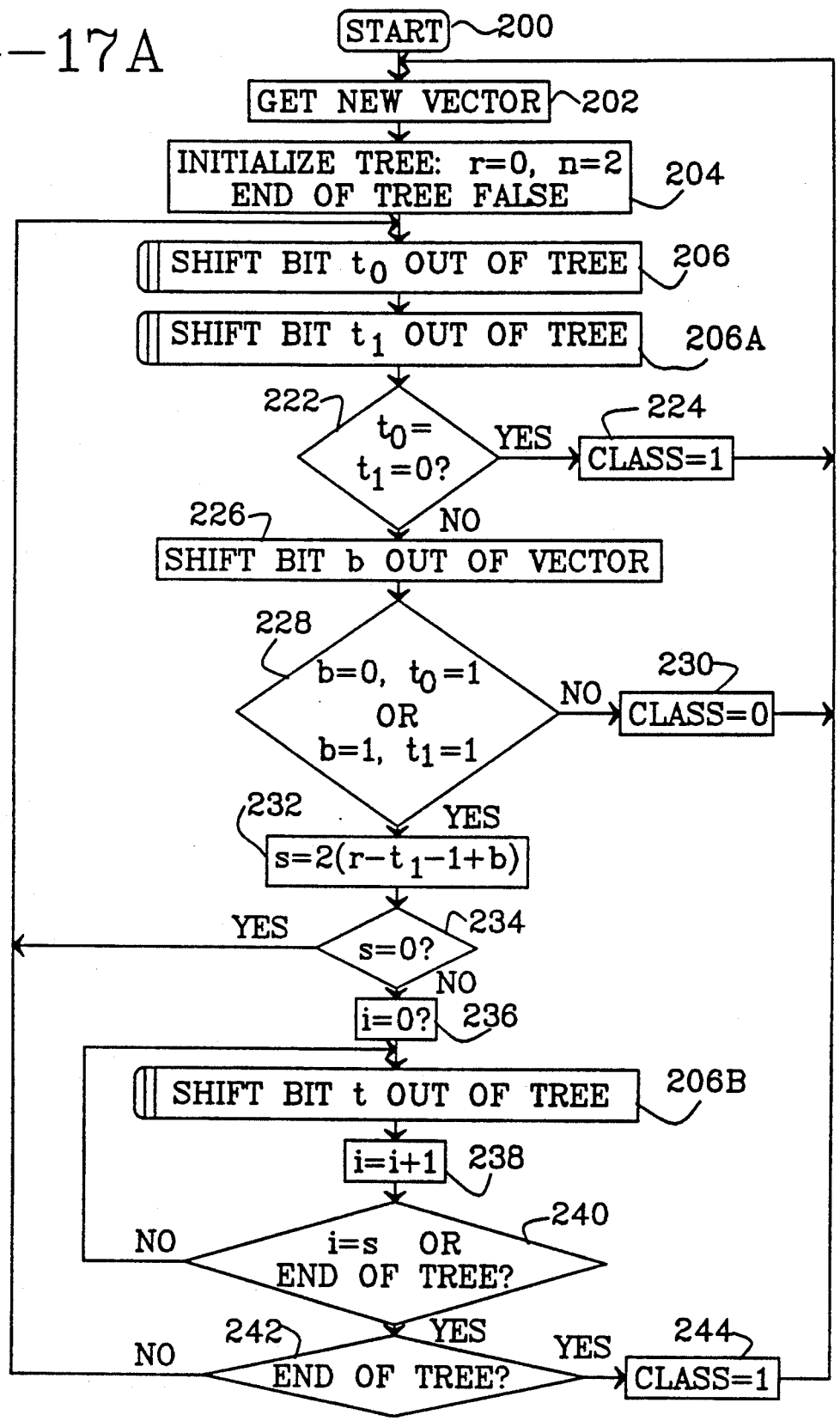
FIGS. 17A and 17B are flow diagrams for use in explaining operation of a digital computer for classifying pattern vectors using a binary tree sequence of the type produced in accordance with this invention, the vector to be classified and the binary tree sequence for use in classifying the vector being shown in FIG. 16.
Figure 17B:
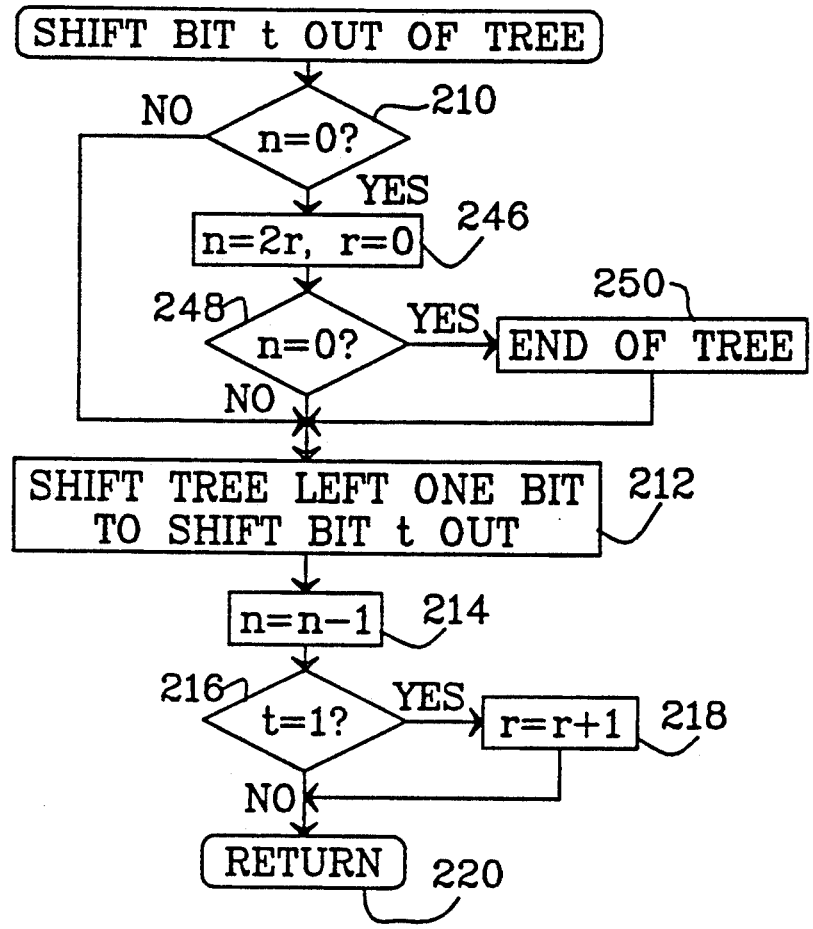

Referring first to FIG. 17A, after start step 200, the new pattern vector to be classified is obtained at step 202. Here, the pattern vector to be classified is 1, 0, 0 as seen in FIG. 16 and as shown at line 1 of FIG. 18A. For the above-mentioned binary tree sequence, this is a category pattern vector and will, therefor, produce a 1 output from the computer as a result of the classification process. At initialization step 204, an r register is loaded with a 0, an n register is loaded with a 2, and an end of tree flag is set to false. (Line 2 of FIG. 18A.) The r register provides a count of the number of 1s already processed in a row, or level, of the binary tree, and the n register provides a count of the number of bits still to be processed in the row. It is known that the first row of the binary tree sequence includes two bits (one bit to indicate the presence or absence of a left branch, and another bit to indicate the presence or absence of a right branch) so the n counter is initialized at 2. The number of 1s in the row is not yet known. Since a 1 in the binary tree sequence indicates a tree branch, it will be apparent that the number of 1s in a row equals the number of doublets, or nodes, in the following row of the binary tree. For example, in the unpruned tree of FIG. 4 it will be seen that row 2 includes three 1s, and following row three includes three doublets. Similarly, in the pruned tree of FIG. 5, row 2 includes a single 1 bit and row three includes a single doublet.

Continuing now the description of FIG. 17A, after initialization, step 206 is entered which identifies a sub-routine for shifting a bit out of the tree. The sub-routine is shown in FIG. 17B. At decision step 210 of the sub-routine it is determined whether $n = 0$. In this case, step 210 is negative whereupon step 212 is entered and the binary tree is shifted left one bit to shift the first bit $b_0$ out of the tree. Then at step 214, the n counter is decremented by 1, as shown at line 6 of FIG. 18A. From step 214 decision step 216 is entered where it is determined that the bit shifted from the binary tree is a 1. Consequently, step 218 is entered where the r counter is incremented by 1. As noted above, the r counter provides a count of the number of 1s in each row, or level, of the binary tree. The sub-routine ends at step 220 and operation returns to FIG. 17A, step 206A.

Steps 206A and 206B shown in FIG. 17A identify the same sub-routine as step 206 described above. However, to facilitate an understanding of the vector classification operation, the A and B suffixes are included in the identification of the sub-routines following step 206. At step 206A (line 9 of FIG. 18A) the steps identified at lines 4-8 of FIG. 18A are repeated. This time, $t_1$ is shifted from the tree, the n counter is decremented by 1 and the r counter is incremented by 1. These results are shown at line 9 of FIG. 18A. The n counter now contains a count of 0 indicating that all of the bits have been shifted from the current row, or level, of the binary tree, namely level 1.

The binary doublet shifted from the tree at steps 206 and 206B is checked at step 222 to determine whether or not both bits of the doublet are 0. As described above, a 00 binary doublet indicates no branches from the node which, therefor, identifies a leaf, or end, node. If step 222 had been affirmative, step 224 would have been entered where the vector would be classified as a category 1 vector, and operation would have returned to step 202 in preparation for classifying the next vector. In this case, decision step 222 is negative whereupon step 226 is entered and bit b, here the first vector element, is shifted from the vector to be classified. In this example, the first bit is a 1, which identifies a branch right.

Next, at decision step 228, it is determined whether or not the binary tree sequence includes a branch in the direction indicated by the vector element, here a right branch. The second bit, $t_1$, of the doublet is a 1 which, as described above, identifies a right branch from the node. Since both $b_0$ and $t_1$ are 1 bits, decision step 228 is affirmative whereupon step 232 is entered. If there had been no branch for the vector element to follow, decision step 228 would have been negative whereupon step 230 would have been entered for classification of the vector as a category 0 vector.

At step 232, the number of bits ,s, to be skipped in the next level of the binary tree sequence is determined. As seen in FIG. 16, the binary doublet at level 1 of the tree is 11, indicating both a branch left and a branch right. The first 1 in the level 1 doublet points to the first doublet at the second level of the binary tree, and the second thereof points to the second doublet, as indicated by arrows 1 and 2 in FIG. 16. Since the first bit in the vector to be classified is a 1 bit (indicating branch right), the right branch of the binary tree is followed to the binary doublet $t_4$, $t_5$, as indicated by arrow 2. In this case, the doublet at $t_2$, $t_3$ is skipped before steps 206 and 206A are reentered. However, a count of the number of 1s at the second level of the tree must be obtained which count, in turn, provides a count of the number of doublets in the succeeding level of the tree.

At step 232 the value of s is determined as follows:

$$s = 2(r - t_1 - 1 + b)$$

$$s = 2(2 - 1 - 1 + 1)$$

$$s = 2$$

Decision step 234 then is entered where it is determined if s equals 0. If s equals 0, no doublets are to be skipped and operation returns to step 206. If, as in the present example, s does not equal 0, step 236 is entered where the i counter is set to zero, where i equals the number of bits shifted from the row. At this point in the operation, shown at line 15 of FIG. 18A, no bits have been shifted from row 2 of the tree.

From step 236, sub-routine 206B, shown at FIG. 17B, is entered where, at step 210 it is determined that the number of bits still to be processed in row 1 now equals 0. Decision step 210 is, therefore, affirmative whereupon step 246 is entered. At step 246 a new value of n is calculated, and r then is set to 0. As noted above, n is the number of bits still to be shifted from the row, and is equal to 2 times the number of 1s contained in the preceding row, or level, of the binary tree. Here, $n = 2 \times 2 = 4$. Next, at decision step 248 it is determined whether or not $n = 0$. If n equals 0, step 250 is entered whereupon the end of tree flag is set to yes. Since decision step 248 is negative, step 212 is entered where the next bit, $t_2$, is shifted from the tree. The n counter then is decremented by 1 at step 214, and at step 216 it is determined that $t \neq 1$ whereupon the sub-routine is ended and operation returns to step 238 of FIG. 17A where the i counter is incremented by 1. (Line 22 of FIG. 18A.) Next, decision step 240 is negative since i does not equal s, and the end of tree flag has not been set to yes. As a result, operation returns to sub-routine 206B where bit $t_3$ is shifted from the binary tree, and the n counter is decremented by 1. The results of this pass through sub-routine 206B are indicated at line 23 of FIG. 18A.

At the end of sub-routine 206B operation returns to step 238 where the i counter is incremented by 1. Now, at decision step 240, it is determined that $i = s$ whereupon the decision is affirmative and decision step 242 is entered. If the end of tree flag had been set, step 242 would be affirmative and step 244 would be entered to classify the vector as a class 1 vector. Here, the end of tree flag has not been set whereby decision step 242 is negative and operation returns to sub-routine 206.

At sub-routine 206, bit $t_4$ is shifted from the tree (step 212) the n counter is decremented by 1 (step 214), and 1 is added to the r counter since $t_4 = 1$ (steps 216 and 218). These changes are shown at line 27 of FIG. 18A.

From sub-routine 206, sub-routine 206A is entered where bit $t_5$ is shifted from the tree (step 212) and the n counter is decremented by 1 (step 214), which changes are shown at line 28 of FIG. 18A.

From sub-routine 206A, decision step 222 is entered where the decision is negative since t does not equal 0. Step 226 therefore is entered whereupon the second bit, $b_1$, is shifted from the vector to be classified. This second vector element is a 0 bit as seen at line 29 of FIG. 18A. Decision step 228 is entered where it is determined that $b = 0$ and $t_0$ (here the first bit t of the doublet $t_4$ $t_5$) equals 1. Consequently decision step 228 is affirmative whereupon step 232 is entered for calculation of the number of bits to be skipped when processing the next level, here the third level, of the binary tree. At step 232, s now is determined to equal 0 as shown at line 30 of FIG. 18A.

From step 232, decision step 234 is entered, which step is affirmative since, as noted above, $s = 0$. As a result, operation returns to sub-routine 206. At sub-routine 206 (FIG. 17B) decision step 210 is affirmative since $n = 0$, whereupon step 246 is entered. At step 246 (line 33 of FIG. 18A) n is calculated as equal to 2, and r is set to zero. At this point in the vector classification process n equals the total number of bits in the third row, or level, of the binary tree since none have yet been shifted from the third row. Next, decision step 248 is negative whereupon step 212 is entered for shifting bit $t_6$ out of the binary tree. As seen in FIG. 16, and as shown at line 34 of FIG. 18A, bit $t_6 = 1$. The n counter then is decremented by 1 at step 214 (line 35 of FIG. 18A) and the r counter is incremented by 1 at step 218 (line 36 of FIG. 18A).

From sub-routine 206, operation returns to sub-routine 206A where the second bit, $t_7$, of the third level of the tree is shifted from the tree (step 212) and the n counter is decremented by 1 (step 214). Since $t_7 = 0$, the r counter is not incremented. The results of this pass through sub-routine 206A are shown at line 38 of FIG. 18B. At line 37 of 18B, the contents of counters r, n, s and i, and the condition of end of tree flag are shown immediately prior to this pass through sub-routine 206A.

From sub-routine 206A, decision step 222 is entered and, since the decision is negative, step 226 is entered where the third vector element, $b_2$, is shifted from the vector. As seen in FIG. 16, and at line 39 of FIG. 18B, $b_2 = 0$. Next, decision step 228 is determined to be affirmative since $t_6 = 1$ and $b_2 = 0$. Step 232 then is entered where a value for s is calculated to be $$s = 2(1 - 0 - 1 + 0) = 0$$

indicating that no bits are to be skipped when shifting bits from the next level of the binary tree, here level 4.

As described above, all nodes at the lowest level of the binary tree comprise end, or leaf, nodes which are identified by the binary doublet 00 in the binary sequence. With the illustrated binary tree sequence shown in FIG. 16, it is known that all level 4 doublets are end nodes. Therefore, zeros may be included at the end of the third level to identify such end nodes, if desired. Alternatively, by marking the end of the binary tree sequence E(N), it is known that a 0 is produced at step 212 whenever operation extends beyond E(N). For simplicity, 0's are shown following end bit E(N) in FIG. 16.

Since s is determined to be 0 at step 232, decision step 234 is affirmative whereupon operation loops back to sub-routine 206. (Line 41 of FIG. 18B.) Here, decision step 210 is affirmative since n=0 whereupon step 246 is entered. At step 246, n is determined to equal 2, and r is set to 0, as shown at line 43 of FIG. 18B. Since following step 248 is negative, step 212 is entered where bit $t_8$ is shifted from the binary tree. At step 214, the n counter is decremented by 1, after which operation returns to sub-routine 206A.

At sub-routine 206A bit $t_9$ is shifted from the tree (step 212) and the n counter is decremented by 1 (step 214) which changes are shown at line 46 of FIG. 18B. Then at step 222 it is determined that $t_8 = t_9 = 0$ whereby step 222 is affirmative whereupon step 224 is entered for classification of vector 1, 0, 0 as a category 1 vector.

Hardware Implementation of Binary Tree

As noted above, the novel binary tree sequence of this invention may be used for classifying pattern vectors in either software or hardware. Hardware implementation using AND gates and an OR gate are shown in FIGS. 3, 3A and 6, and are described above.

Alphabet Recognition Network

Figure 19:
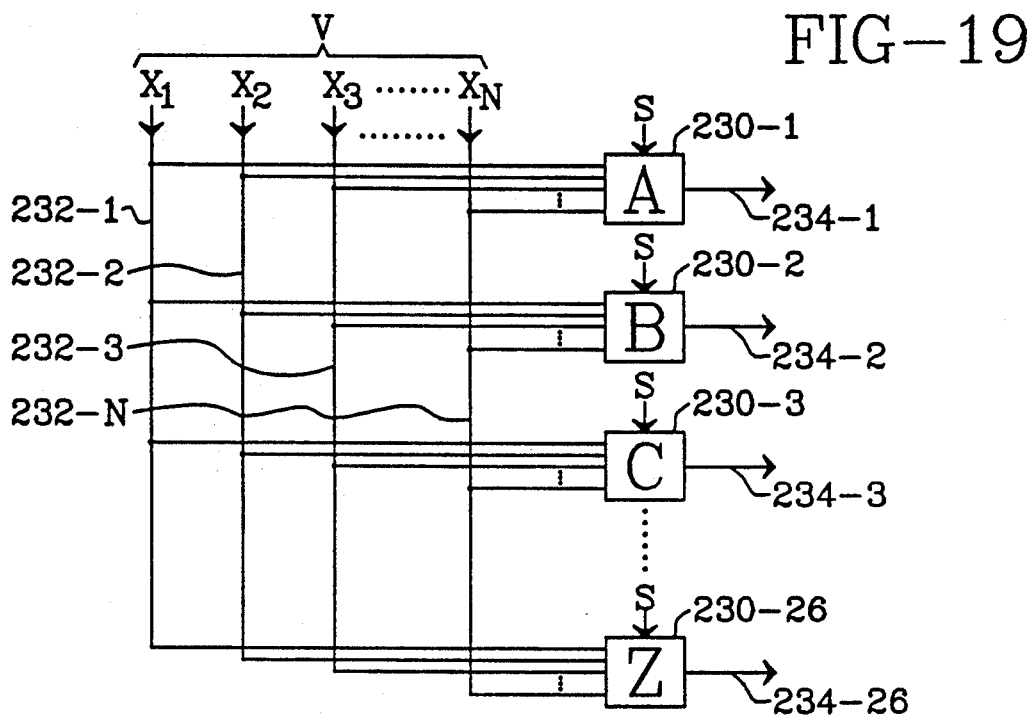
FIG. 19 is a block diagram of an artificial neural network for use in recognizing letters of the alphabet, which network employs processing units comprising binary trees in accordance with this invention.

As noted above, the pattern recognition method of this invention may be used for recognizing signal patterns which may or may not have spatial significance. For example only, the signals to be recognized may comprise signals representative of letters of the alphabet, and a network for recognizing each letter is shown in FIG. 19, to which figure reference now is made. There, an array of processing units 230-1 through 230-26 is shown, each having N inputs 232-21 through 232-N and a single output 234-1 through 234-26. The number of inputs to the processing units equals the number of elements in the vectors V to be recognized, and in FIG. 19 vector elements $x_1, x_2 \ldots x_N$ of vector V are shown at the N inputs to the processing unit array.

The processing units 230-1 through 230-26 each comprise a network of AND gates connected in a binary tree having N levels, to which levels an associated vector element input is connected. An OR gate connects end nodes of the binary tree to the processing unit output 234-1 through 234-26. Start pulse inputs, S, are shown supplied to each processing unit. The processing units are of the type shown in FIGS. 3, 3A and 6 described above.

The set of binary training pattern vectors used in the generation of binary sequences of doublets representative of the N-level binary trees included in processing units 230-1 through 230-26 comprises a plurality of vectors for each letter of the alphabet. For generation of the binary sequence of doublets for the letter A, category 1 vectors comprise the A vectors, and category 0 vectors comprise the remainder of the vectors, i.e. the B through Z vectors. Using the same set of binary training pattern vectors, the binary sequence of doublets for the letter B is generated by using the B vectors as category vectors, and the remainder as category 0 vectors. Binary tree sequences of doublets for each letter of the remainder of the letters of the alphabet are generated in a similar manner. The hardware processing units 230-1 through 230-26 are constructed on the basis of binary tree information contained in the binary tree sequence of doublets generated using the set of binary training vectors, in the manner described above.

Simplified Alphabet Recognition Network

Figure 20:
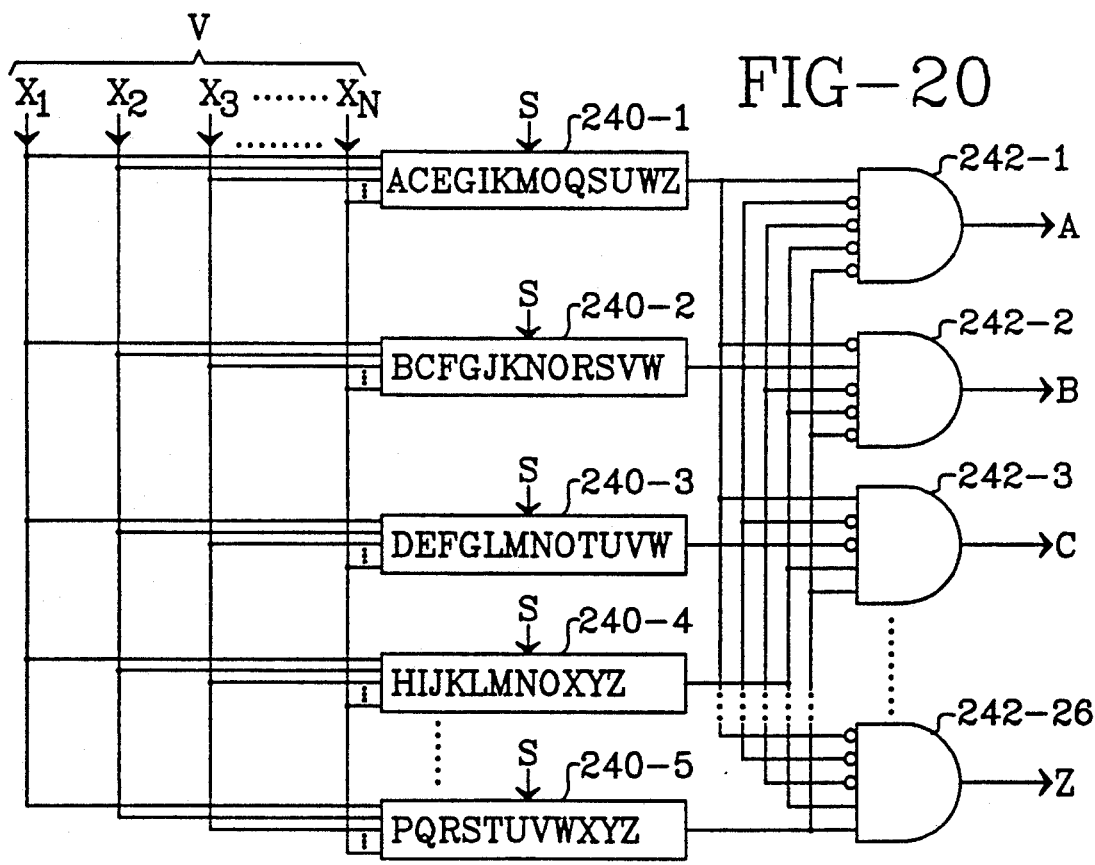
FIG. 20 is a block diagram of an artificial neural network for recognizing letters of the alphabet which is similar to that of FIG. 19 but which employs fewer binary trees.

A modified form of pattern recognition network for the recognition of alphabet letters is shown in FIG. 20, to which figure reference now is made. In this arrangement, five processing units 240-1 through 240-5 are employed, together with an array of twenty six AND gates 242-1 through 242-26, i.e. one AND gate for each letter of the alphabet. Again, the processing units each comprise a network of AND gates connected in a tree having N levels, to which levels an associated vector element input is connected. Leaf, or end, nodes of the binary tree are connected to an OR gate which, in turn, supplies the processing unit output. In this arrangement, each processing unit provides an output in response to pattern vector inputs of a plurality of different letters. For illustration purposes only, processing unit 240-1 produces a 1 output in response to an A, C, E, G, I, K, M, O, Q, S, U, W, or Z pattern vector input. In the drawings, the processing elements are labeled with the alphabet letter pattern vectors to which they are responsive. The binary tree structure of AND gates employed in processing unit 240-1 is based upon the binary sequence generated when using binary training pattern vectors for the letters A, C, E, G, I, K, M, O, Q, S, U, W, and Z as category 1 vectors, and the remaining vectors, here the B, D, F, H, J, L, N, P, R, T, V, X, and Y training pattern vectors as category 0 vectors. The binary tree structures employed in the other processing units are constructed using the same set of binary training pattern vectors, with appropriate identification thereof as category and category 0 vectors.

Outputs from each processing unit are connected as inputs to each of the twenty six AND gates 242-1 through 242-26. By using appropriate inverting and non-inverting inputs at the AND gates, the AND gate outputs individually identify the twenty six letters of the alphabet.

Obtaining Binary Training Pattern Vectors

Binary pattern vectors for use as inputs to computer 22 (FIG. 7) for generating binary trees for use in pattern recognition systems of the type shown in FIGS. 19 and 20 simply may be obtained by scanning a plurality of different fonts of letters of the alphabet. In FIG. 21, to which reference now is made, the letter A is shown scanned by a scanner 250. The letter may be located in a region 252 of a printed document, or the like. The scanner output comprises a binary pattern vector V comprising vector elements $X_1$ through $X_N$, where N is the total number of vector elements. The vectors may be stored in memory 22A of computer 22. The total number of vector elements equals the number of pixels (either black or white) in the region 252. By obtaining printed letters of the alphabet from a large base of such characters, a pattern recognition system capable of recognizing a large number of such letters with different fonts may be constructed.

Multilayer Artificial Neural Network

Multilayer artificial neural networks may be constructed using processing units in the form of a binary tree of the type shown in FIGS. 3, 3A and 6. In FIG. 22, to which reference is made, a prior art back error propagation network is shown which comprises, for example, an input row i, a hidden row j, and output row k. The input row i, hidden row j and output row k are shown to include three processing units 260-i through 260-3, four processing units 262-1 through 262-4, and two processing units 264-1 and 264-2, respectively. The input row i includes the same number of processing units as there are elements in the input vector V. Prior art back error propagation networks for use with either binary or analog vector inputs are well known and, for purposes of description, it will be assumed that the illustrated arrangement operates with a three-element binary vector input. In any event, the outputs from the processing units 260-1 through 260-3 in the input row simply are the same as the inputs thereto. The output $0_i$ from a processing unit in the first row simply equals $X_i$.

The output from each of the input processing units is supplied as an input to each of the processing units 262-1 through 262-4 in the hidden row. A bias, b, also is supplied to the processing units of the hidden and output rows. The outputs from the input and hidden rows of processing units are weighted at the processing units of the hidden and output rows, respectively, as indicated by the respective weights $W_{ij}$ and $W_{jk}$ shown in FIG. 22.

Processing performed by processing unit 262-1, which is the same for all of the units in the hidden and output rows, is illustrated in FIG. 23, to which figure reference now is made. The binary outputs (0,1) from units in the input row i are weighted by weights $W_{ij}$, and the weighted outputs are summed. The bias voltage then is added to the weighted su to provide an output:

$$u_j = (\Sigma_i w_{ij} o_i) + bias_j \quad (1)$$

The processor unit output $o_j$ is a function of $u_j$:

$$o_j = F(u_j) \quad (2)$$

For this operation, function F comprises a step function whereby output $o_j$ is 0 when $u_j$ is below a threshold level, and is 1 when it is at or above the threshold level. (It here will be noted that prior art artificial neural networks which employ different threshold functions, F, which do not provide for a binary or bi-polar output from processing units in response to binary or bi-polar inputs thereto are not adapted for operation using binary tree networks of this invention. Binary inputs and outputs, or bi-polar inputs and outputs which can be converted to binary form, are required.) The network is trained using a set of input and output training vector pairs, during which training values of weights and bias are established for each of the processing units in rows following the input row. The training of such networks is well known in the prior art, and includes repeated use of the set of input and output vector pairs while adjusting values of weights and bias of the processing units.

Figure 24:
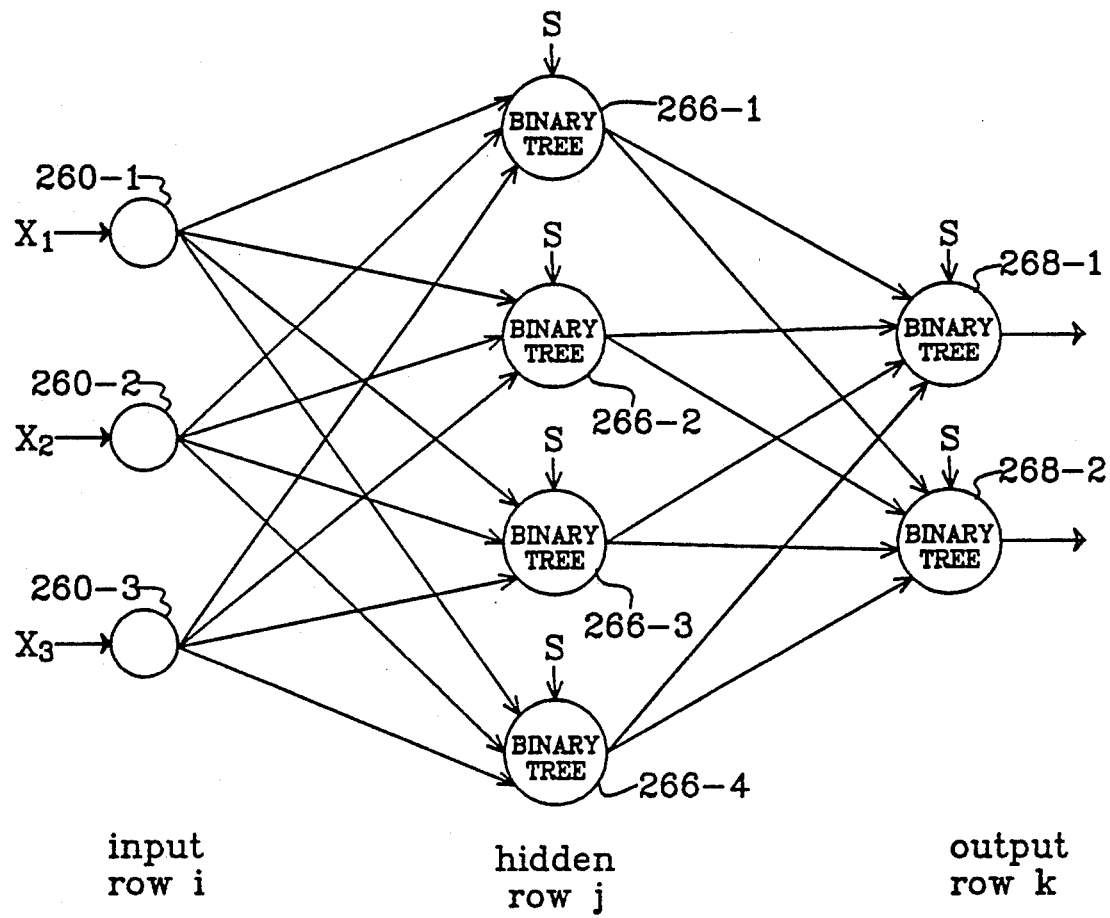
FIG. 24 is a block diagram of a novel artificial neural network of the type shown in FIG. 22 but which employs processing units comprising novel binary trees of this invention.

Once the neural network has been trained, a binary tree network of the type of the present invention may be substituted for those processing units of the network which include binary, of bi-polar, inputs and outputs. The resultant neural network which includes binary tree type processing units at the hidden and output rows thereof is shown in FIG. 24, to which figure reference now is made. There, processing units 266-1 through 266-4 and 268-1 and 268-2 in the hidden and output rows of the network are shown which units comprise binary trees. A start pulse, S, input is supplied to the level 1 AND gate inputs of the trees in the manner described above.

A set of binary pattern training vectors for use in construction of each of the binary trees is obtained using the input vectors of the input and output vector pairs. The input vectors are supplied to the input row of the trained network, and the binary inputs to each of the processing units 262-1 through 262-4 and 264-1 and 264-2 are recorded together with the associated binary output from the unit. If the processing unit output is a 1, the input vector to the unit is identified as a category 1 vector, and if it is a 0, it is identified as a category 0 vector. When all of the vectors in the training set have been supplied to the network, a set of binary training pattern vectors will have been produced for each of the processing units 262-1 through 262-4 and 264-1 and 264-2.

Once the binary training pattern vectors have been obtained, a binary tree is generated for each processing unit, in a manner described above. As noted above, the input vector elements are reordered before the tree building so that the least variable elements are entered first thereby minimizing the number of binary tree nodes. After construction of the binary trees in computer memory, a corresponding AND and OR gate network thereof may be implemented in the manner described above. Using VLSI circuit techniques, an entire neural network may be included on a single chip, which network is substantially larger than any current VLSI back error propagation networks.

As described above, binary trees in computer memory may be used to classify vectors; hardware implementation of the trees not being required. Both the prior art neural network shown in FIG. 22 and the binary tree type neural network shown in FIG. 24 may be implemented by a computer. However, a major advantage of the binary tree type network is the substantially smaller amount of computer memory required as opposed to that for the prior art network.

Modified Method of Generation Binary Tree

Other methods of generating a binary tree for vector classification may be used, the invention not being limited to the above-described method. Another method involves supplying a random set of category 1 and category 0 binary training pattern vectors to a computer for generation of the binary tree and storage thereof in computer memory. In FIGS. 25A through 25H a sequence of binary trees for explaining a binary tree building process in accordance with this modification of the invention is shown, to which figures reference now is made. It here will be understood that the binary tree building process is readily implemented using a digital computer in which case the resultant binary tree comprises a binary sequence of doublets in computer memory, each of which doublets represents a tree node of one of the "no branch", "branch only left", "branch only right" and "branch both left and right" types as described above.

For purposes of illustration, building of a tree to solve the exclusive OR (XOR) problem now will be described with reference to FIGS. 25A-25H. The two-element training pattern vectors are as follows:

Category 1

$$\begin{pmatrix} 0 \\ 1 \end{pmatrix} \text{ and } \begin{pmatrix} 1 \\ 0 \end{pmatrix}$$

Category 0

$$\begin{pmatrix}0\\0\end{pmatrix} \text{and} \begin{pmatrix}1\\1\end{pmatrix}$$

During training, a random order of category 1 and category 0 pattern vectors are presented to the tree one at a time. The vector is entered into the tree and a path is followed until a node is reached that has no branches, or there is not a branch in the correct direction (e.g., $x_i=0$ but there is no branch to the left). The following rules then apply:

a. If there are no branches from the node, no branch node can be added until a category 0 path arrives at the node; the node being activated by the arrival of a category 0 path thereat.

b. If a category 1 path arrives at an activated node and there is not a branch to continue the path in the correct direction, a branch is added in that direction.

c. If a category 0 path does not arrive at a node the node is made an end point.

For purposes of illustration, vectors may be presented to the tree in the following order:

$$\begin{pmatrix}0\\0\end{pmatrix}\begin{pmatrix}1\\1\end{pmatrix}\begin{pmatrix}0\\1\end{pmatrix} \text{and} \begin{pmatrix}1\\0\end{pmatrix}$$

Figure 25A:
FIGS. 25A through 25H illustrate steps included in a modified method of generating a binary tree which also embodies the present invention.

The first vector (00) is a category 0 vector which activates the first node, activation of the node being identified by the check mark adjacent thereto as shown in FIG. 25A. A separate computer memory location may be used for the activation memory as described above and shown in FIG. 15. Alternatively, a third bit may be added to the binary doublets to identify those doublets, or nodes, which are activated. The binary tree and activation memory locations are initialized with zeros prior to the tree building process. Once the tree building process is completed, the activation bits may be deleted from memory, and memory consolidation then may be performed to provide for a series of doublets in adjacent memory locations which define the binary tree.

Figure 25B:
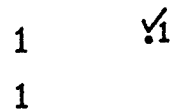
Figure 25C:
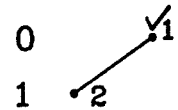
Figure 25D:
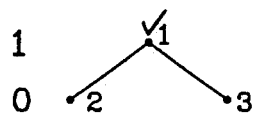
Figure 25E:
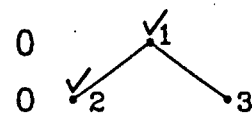
Figure 25F:
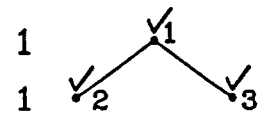
Figure 25G:
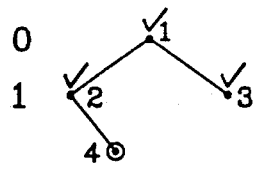
Figure 25H:
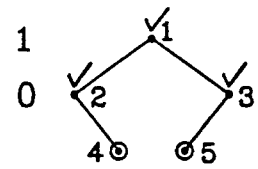

The second vector (11) presented to the tree also is a category 0 vector so no branches are added to the tree, as seen in FIG. 25B. The next vector (01) to be presented to the tree is a category 1 vector, and since the first node is activated, a branch in the 0 direction (to the left) is added as shown in FIG. 25C. Next, category 1 vector (1) causes a branch to the right as seen in FIG. 25D. The process of presenting training vectors to the tree is repeated. Now, when category 0 vector (00) is presented, the left node in the second level is activated as seen in FIG. 25E. Next, the right node in the second level is activated by the category 0 vector (11) as seen in FIG. 25F. The process is continued until the two nodes at the third level are added by the category 1 vectors (01) and (10) as shown at FIGS. 25G and 25H, respectively. In practice, the presentation of training vectors to the tree may be continued until no additional nodes are added, or until the number of nodes added when cycling through the set of vectors is small. Since no category 0 vectors can reach the illustrated level three nodes (nodes 4 and 5) they are designated end points. The sequence of doublets comprising the binary tree of FIG. 25H is as follows:

1101100000.

Figure 26:
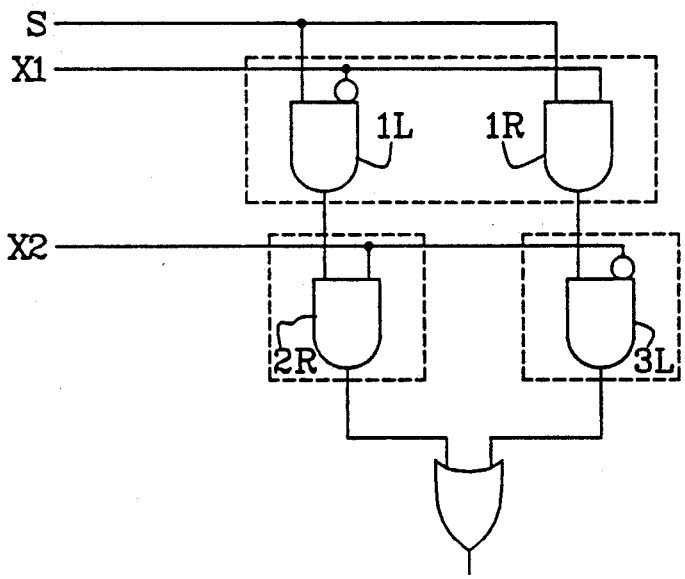
FIG. 26 shows an AND and OR gate implementation of the binary tree illustrated in FIG. 25H.

A hardware AND and OR gate embodiment of the binary tree illustrated in FIG. 25H is shown in FIG. 26.

Construction of Ordering Vector, O

As noted above, when vectors of large dimension are involved, a substantial reduction in tree size is possible by optimizing the order of vector elements. Reordering makes use of the fact that some vector elements have much more statistical variability than others when there is clustering. During the binary tree building, or training, mode of operation the least variable vector elements are entered first.

As an example, some of the elements of each binary vector in a single cluster may be constant. Consider the cluster $$\begin{pmatrix}0\\1\\1\end{pmatrix}\begin{pmatrix}1\\1\\1\end{pmatrix}\begin{pmatrix}1\\1\\0\end{pmatrix} \text{and} \begin{pmatrix}0\\1\\1\end{pmatrix}$$

where the second vector element is constant. This cluster occupies the back plane of a three dimensional cube. The elements that are most often constant over the training set which are entered first into the tree are referred to as elements that "lead" to a cluster.

A method for identifying these lead elements now will be described with reference to the flow diagram of FIG. 27. As will become apparent, the method may be readily implemented using a general purpose digital computer. After start step 500, the set of binary training pattern vectors, i.e. data set, is entered into the computer at step 502 where the Kth vector $X(K) = x_1(K), x_2(K) \ldots x_n(K)$. Then at step 504 clusters in the data set are located. There are a number of cluster-finding schemes in routine use that may be employed. One such scheme employed in the practice of this invention involves centering spherical surfaces about the mean of the vectors that fall within the surface. The vectors are examined one at a time. If a vector falls within a sphere, a new mean (i.e. center) is calculated. If the vector does not fall within a sphere, a new sphere is started, and sphere radii are adjusted to be proportional to the second moment about the center of the vectors that fall inside. Any outlying vectors, i.e. vectors not included in a cluster, are not considered, or employed, in the remainder of the operations included in the determination of the ordering vector shown in FIG. 27.

Next, at step 506, for each cluster the probability that the ith element, $x_i$, equals is calculated as follows:

$$P_1(i,j) = \text{Prob} (x_i(K) = 1/\text{vector } \epsilon \text{jth cluster})$$

At step 506 the probability that the ith element, $x_i$, equals 0 also is determined as follows:

$$P_0(i,j) = 1 - P_1(i,j)$$

Then, at step 508, the entropy $H(i,j)$ for each element of each cluster j is determined. The entropy of $x_i$ for the jth cluster is:

$$H(i,j) = -P_0(i,j)\log P_0(i,j) - P_1(i,j)\log P_1(i,j)$$

It will be noted, for example, if $x_i$ is always 1 when the vector belongs to the jth cluster, $H(i,j)=0$ because $P_o(i,j)=0$ and
$\log(1)=0$.

Next, at step 510 a measure of the vector element entropy over all of the clusters is determined. Either total or average entropy may be employed in the process. Total entropy of $x_i$ over all of the clusters is $H(i) = \Sigma_j H(i,j).$ The average entropy is determined by including probability $P_j$ in the calculation, where $P_j$ is the probability that a vector belongs to the jth cluster.

Average entropy of $x_i$ over all of the clusters is the sum:

$H(i) = \Sigma_j P_j H(i,j).$

Figure 27:
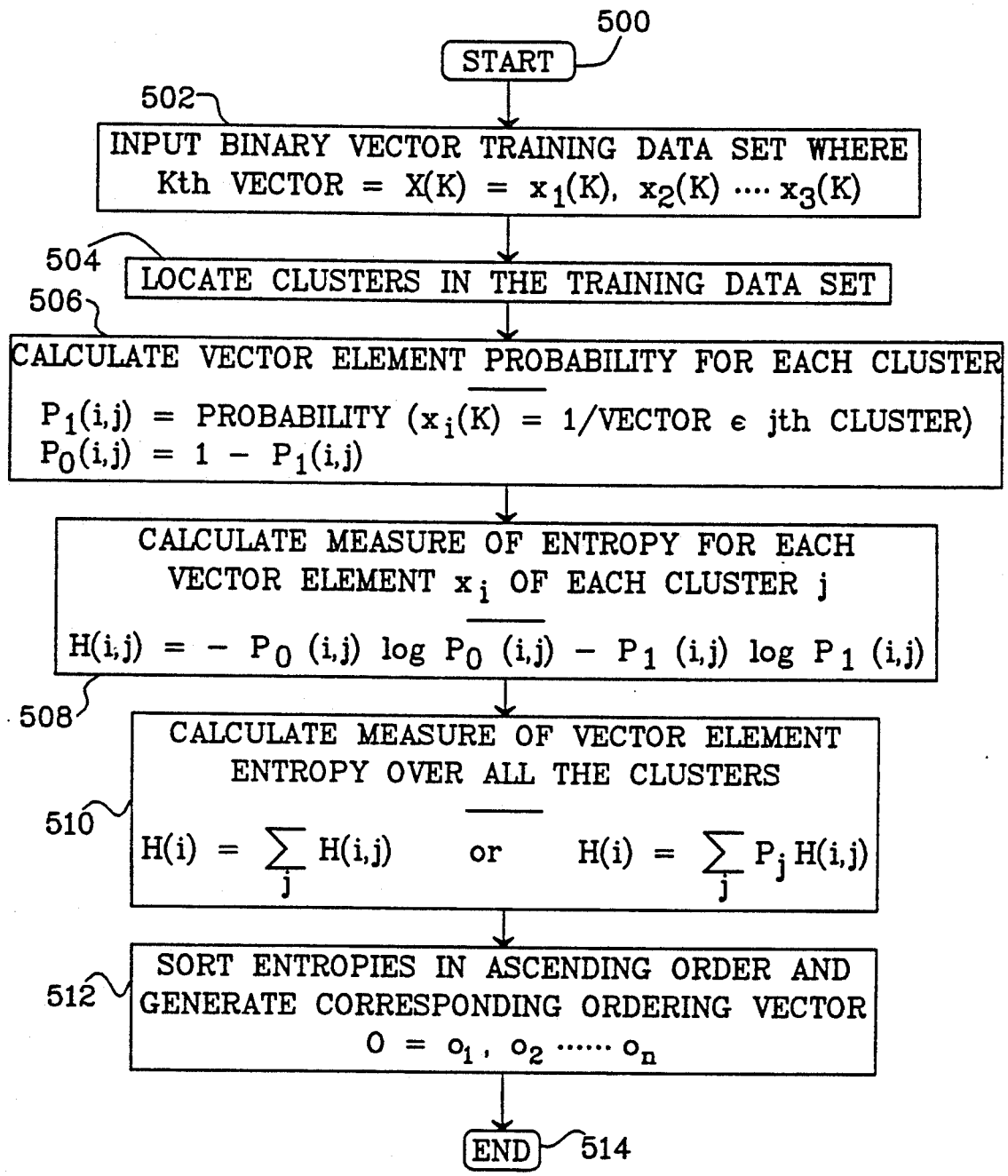
FIG. 27 is a flow diagram for use in explaining operation of a digital computer for generation of an ordering vector for use in reordering vector elements so as to reduce the number of nodes in the binary tree.

In the embodiment illustrated in FIG. 27 the entropies, $H(i)$, are sorted in ascending order and a corresponding ordering vector $O=(o_1, o_2, \ldots o_n)$ is generated at step 512. The generation of an ordering vector routine ends at end step 514. Once the desired vector element order is determined using training pattern vectors, the training pattern vector elements are reordered for use in the binary tree building process. Vectors to be classified using binary trees constructed using the training data set with reordered vector elements are provided with the same vector element order prior to the classification process.

Analog Signal Source

Figures 28, 29:
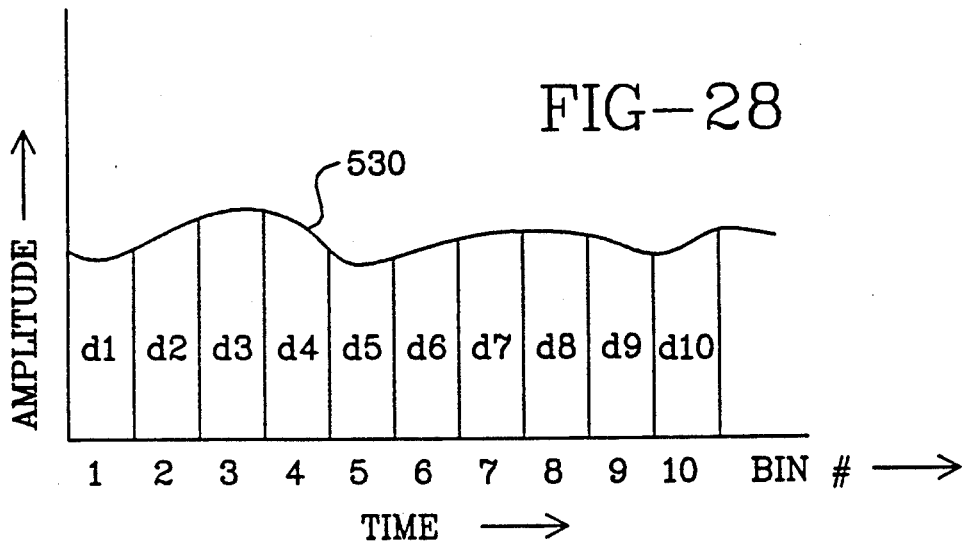
FIG. 28 shows an analog waveform from which a digital vector may be obtained.
FIG. 29 is a chart showing digital and binary vectors and entropy values of vector elements for use in explaining a modified form of generating an ordering vector in accordance with the present invention.

Often, signals to be classified comprise analog signals such as sonar or radar return signals, speech signals, and the like. In FIG. 28, an analog signal 530 is shown. Typically, the signal is divided into a plurality of quantization bins, such as the 10 bins shown in FIG. 28. Values d1 through di0 for the area under the curve in each bin are determined. Often these values are in decimal form, either floating point or integer.

As shown in FIG. 29, the 10 decimal values d1 through d10 comprise the 10 elements of the decimal pattern vector D. For use in the present invention, the decimal pattern vector, D, is converted to a binary pattern vector X. For purposes of illustration, each element of the decimal pattern vector is expanded into a five bit binary representation whereby the binary vector X includes 50 vector elements. The most significant bit (MSB) and least significant bit (LSB) for some of the 10 expansions are identified in FIG. 29.

Modified Method of Constructing Ordering Vector, O

When the binary vector data set is derived from a non-binary vector data set, as in the manner described above with reference to FIGS. 28 and 29, a modified method of construction of the ordering vector, O may be employed. First, the decimal pattern vectors are converted to binary form, as illustrated in FIG. 29. Then, steps 502 through 510 of FIG. 27 are performed whereby a measure of entropy over all the clusters for each of the vector elements $x_1$ through $x_{50}$ is obtained. Now, instead of simply sorting the entropies in ascending order and generating a corresponding ordering vector upon which reordering is based, the entropies of groups of vector elements are sorted in ascending order. In particular, the first group of vector elements to be sorted comprises the MSBs in the binary expansion, the next group comprises the next MSBs, etc., and the final group comprises the LSBs in the binary expansion. The MSBs in the illustrated expansion are bits $x_1, x_5, x_{11}, x_{16}, x_{21}, x_{26}, x_{31}, x_{36}, x_{41}$, and $x_{46}$. Reordering of the entropy values, $H(i)$, of the most significant bits may result in the order illustrated in FIG. 29 for example. The sequence of subscripts of the reordered entropy values, $H(i)$-Reordered, identifies the order of the ordering vector, and in the illustrated arrangement, vector elements would be reordered as follows:

$x_{21}, x_{16}, x_{36}, x_{46}, x_1, x_5, x_{41}, x_{31}, x_{26}, x_{11}, x_2, \ldots x_{10}.$ In either method of constructing an ordering vector, a measure of vector element entropy for each element over all of the clusters is calculated and sorted in ascending order, either by groups or as a whole.

Sonar System with Neural Network

Figure 30:
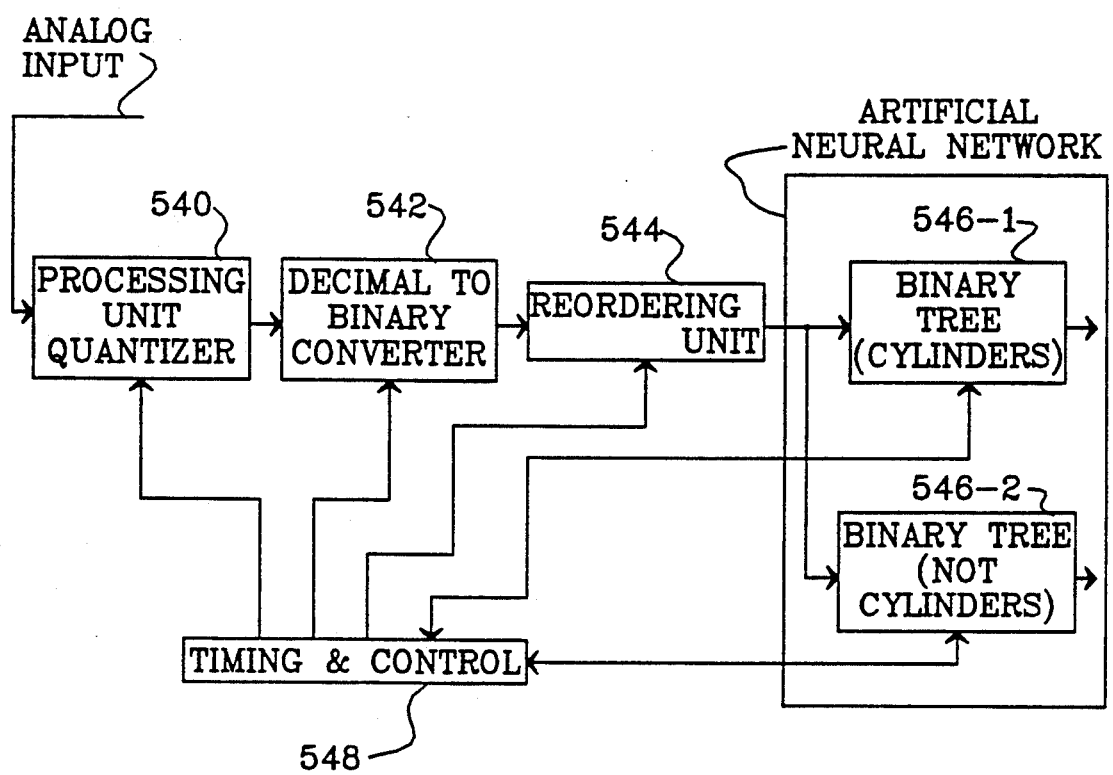
FIG. 30 is a block diagram showing a binary treepair for use in a sonar system.

A novel artificial neural network employing binary trees is shown in FIG. 30, to which figure reference now is made. For purposes of illustration only, a neural network which is responsive to sonar signals for use in identifying metal cylinders on the sea floor is shown. Return signals from a sonar system are supplied to a preprocessing unit 540 which includes a quantizer where they are divided into a predetermined number of frequency bands, or ranges. For example, sixty frequency bands may be employed. Energy is integrated across each frequency band to provide for sixty decimal value outputs from the quantizer. The resultant sixty element decimal vector output from preprocessing unit 540 is supplied to decimal to binary converter unit 542 where each of the decimal elements is expanded into, say, a five bit binary representation, in which case the resultant binary vector includes 300 vector elements.

Binary vectors from converter unit 542 are supplied to a reordering unit for reordering of the vector elements in accordance with an ordering vector obtained in a manner described above. As noted above, a measure of variability of binary vector elements included in the vector training data set is obtained, and vector elements of the data set are reordered in order of increasing variability. Reordering unit 542 simply provides the binary vector to be classified with the same vector element order as the training binary vectors used in the generation of binary trees 546-1 and 546-2, to which trees the binary output from the reordering unit is supplied.

For the illustrated arrangement, training pattern vectors are derived from sonar signal responses, some of which are return signals from metal cylinders, and others of which are not from metal cylinders. Generation of binary tree 546-1 employs the cylinder return signals as category 1 signals and, say, return signals from rocks as category 0 signals. Binary tree 546-2, on the other hand, employs those return signals that are not from metal cylinders as category signals, and cylinder return signals as category signals. With this arrangement, the one tree 546-I is constructed to output a 1 when the pattern category vector to be recognized (here a metal cylinder pattern) is input, and the other tree 546-2 is constructed to output a 1 when the input is not from said metal cylinder pattern category. In brief, tree 546-1 outputs a 1 when the input is from the pattern category (metal cylinder) and binary tree 546-2 outputs a i when the input is not from the pattern category. Timing and control unit 548 has outputs to the various units of the system for timing and control purposes.

Error Correction

By using a tree-pair for each different pattern category to be recognized, a powerful error correction procedure can be used. In the FIG. 30 arrangement, only one tree-pair is shown for use in recognizing one pattern category. Obviously, additional tree-pairs may be employed. For example, a second tree-pair for use in recognizing whales may be included, wherein one tree of the pair is constructed to output a 1 when the whale pattern category is input, and the other is constructed to output a i when the input is not from the whale pattern category. Training pattern vectors from all pattern categories, or groups, are used in training the binary trees.

It can be shown that for a binary tree-pair of the type shown in FIG. 30,

1) The output state 1,1 (both trees outputing a 1) can never occur.

2) When the state 0,0 occurs the paths both terminate at a node, without the correct branch, at the same level of the trees.

3) The bit at that level (i.e. the level at which the path traversed by the vector terminates) is opposite the corresponding bits in a vector that results in an output state 1 from one of the trees and in another vector that results in an output state 1 in the other tree.

In accordance with another aspect of this invention, when the 0,0 state occurs in the tree-pair arrangement, such as that shown in FIG. 30, the binary vector element at the level at which the path traversed by the vector terminates is switched whereby the paths are continued. Now, if an end point is reached in tree 546-1, the vector is classified as a category vector, i.e. as one identifying a cylinder. If, on the other hand, an end point is reached in the 546-2, the vector is identified as a vector not from the cylinder category.

Figure 31A:
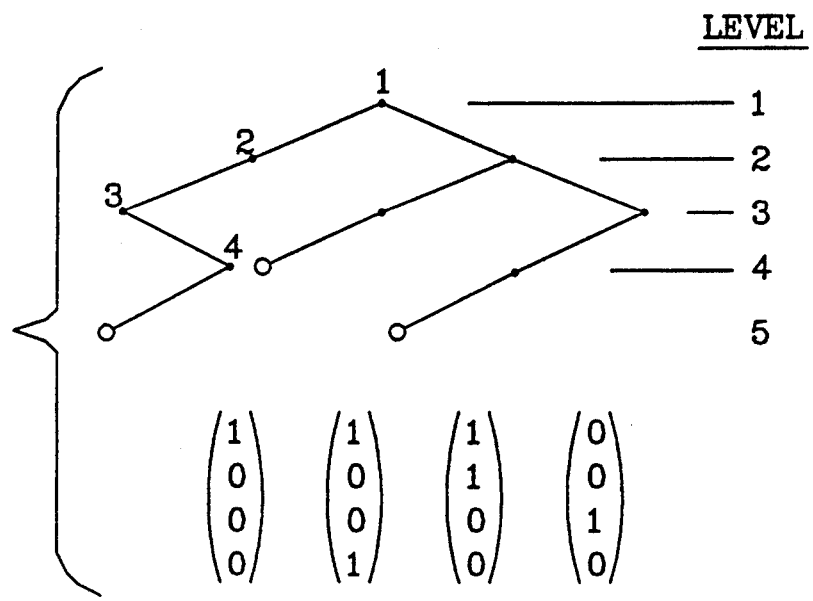
FIGS. 31A and 31B show a binary tree-pair for use in explaining operation of an error correction method.
Figure 31B:
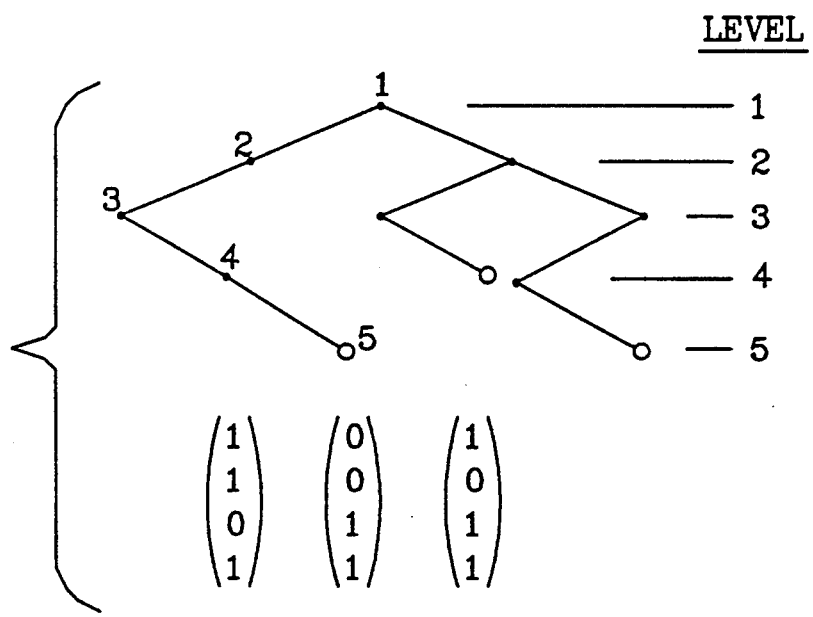

This error correction scheme using dual binary trees is illustrated in FIGS. 31A and 31B. The binary tree of FIG. 31A outputs a 1 for the four vectors below it, and the binary tree of FIG. 31B outputs a 1 for the three vectors below it. Assume one of the vectors for the tree of FIG. 31B

$$\begin{pmatrix} 0 \\ 0 \\ 1 \\ 1 \end{pmatrix}$$

is to be classified but noise has reversed the bit at the third level so that the input is $$\begin{pmatrix} 0 \\ 0 \\ 0 \\ 1 \end{pmatrix}$$

The path through both trees due to this vector will be from node I to node 2 to node 3. Node 3 has no 0 branch so both trees output a 0. The path from both trees terminates at level 3.

In accordance with this invention, the vector element at the binary tree level at which the path traversed by the vector terminates is changed for continuation of the path along the tree. Here, since the path traversed terminates at level 3, the third vector element is changed from a 0 to a 1. Now, in the tree of FIG. 31A, the path is from node 3 to node 4 which does not have a 1 branch. Consequently, the output from this tree is 0. In the tree of FIG. 31B, the path continues from node 3 to node 4 to node 5, which is an end node, and the output is 1. Both trees then have the correct output. It here will be noted that when the output states of a tree-pair are 0,1 or 1,0 the path lengths through both trees are equal, where path lengths are defined as the number of bits, or vector elements, that must be input to either breakout or to reach an end point.

Figure 32:
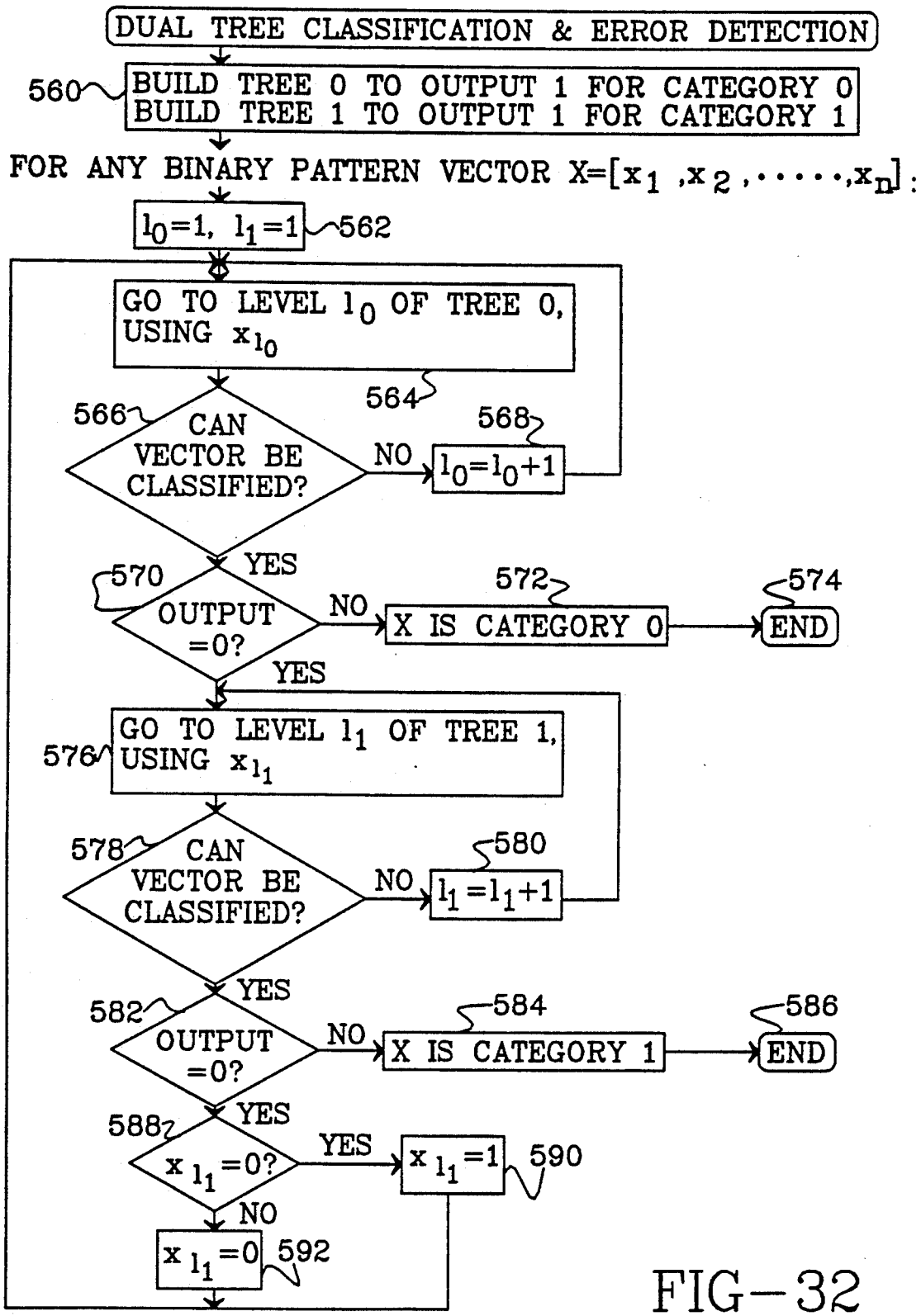
FIG. 32 is a flow diagram for use in explaining operation of the error correction method illustrated in FIGS. 31A and 31B.

A flow diagram for use in explaining operation of a tree-pair neural network is shown in FIG. 32, to which figure reference now is made. Using the binary training pattern vector set, first and second trees, Tree 0 and Tree 1, respectively, are constructed whereby Tree 0 outputs a 1 for category 0 training vectors, and Tree 1 outputs a 1 for category 1 training vectors. The tree building process may result in tree pairs 546-1 and 546-2 shown in FIG. 30, or the pair of trees shown in FIGS. 31A and 31B.

For any binary pattern vector to be classified, such as $X=(x_1, x_2, \ldots, x_n)$ counters $l_0$ and $l_1$ are set to 1 as shown at step 562. Counters $l_0$ and $l_1$ identify levels in Tree 0 and Tree 1, respectively. At step 564, "Go to level $l_0$ of Tree 0, using $x_{l_0}$", the first vector element is supplied to the first level of Tree 0. Then, at decision step 566, it is determined whether or not the vector can be classified. As described in detail above, a vector can be classified if either the path terminates without reaching an end point, or if an end point is reached. If decision step 566 is negative, step 568 is entered where counter $l_0$ is incremented by 1, and step 564 is reentered where the next level of Tree 0 is checked using the next vector element.

If decision step 566 is affirmative, decision step 570 is entered where it is determined if the output is a 0. If not, step 572 is entered where the vector is identified as a category 0 vector, i.e. as a pattern not from the pattern category identified by Tree 1. With classification of the vector, the process ends at step 574.

If decision step 566 is affirmative, i.e. if the path terminates by breaking out of Tree 0 before reaching an end point, step 576 is entered whereupon vector element $x_{l_1}$ is supplied to level 1 of Tree 1. Step 576, and following steps 578, 580, 582, 584 and 586 for Tree 1 correspond to steps 566 through 574 for Tree 0, described above. In brief, at decision step 578 it is determined whether or not the vector can be classified. If not, step 580 is entered for incrementing counter $l_1$ by 1, and step 576 is reentered. If the vector can be classified, decision step 582 is entered from step 578 where it is determined if the output is a 0. If the output is a 1, step 584 is entered where the vector is identified as a category 1 vector, i.e. as a pattern from the pattern category identified by Tree 1. With the vector classified, step 586 is entered to end the classification process.

If, on the other hand, the output from Tree 1 is 0, whereupon decision step 582 is affirmative, decision step 588 is entered. An affirmative output from decision step 582 is obtained only if a 0 output is obtained both from Tree 0 and from Tree 1. As noted above, when the 0, 0 output state occurs the paths both end at the same level in each tree. The vector element at the node at which the path ends is changed, and classification continues.

At decision step 588 it is determined if $x_{11}$ equals 0. If it does, it is changed to a 1 at step 590, and if it does not, it is changed to a 0 at step 592. From step 592 operation returns to step 564 where the categorization process continues at the same level at which the paths terminated. In the illustrated arrangement, a plurality of vector elements may be changed before the vector is classified as either a category 0 or category 1 vector.

Pattern Recognition System

Figure 33:
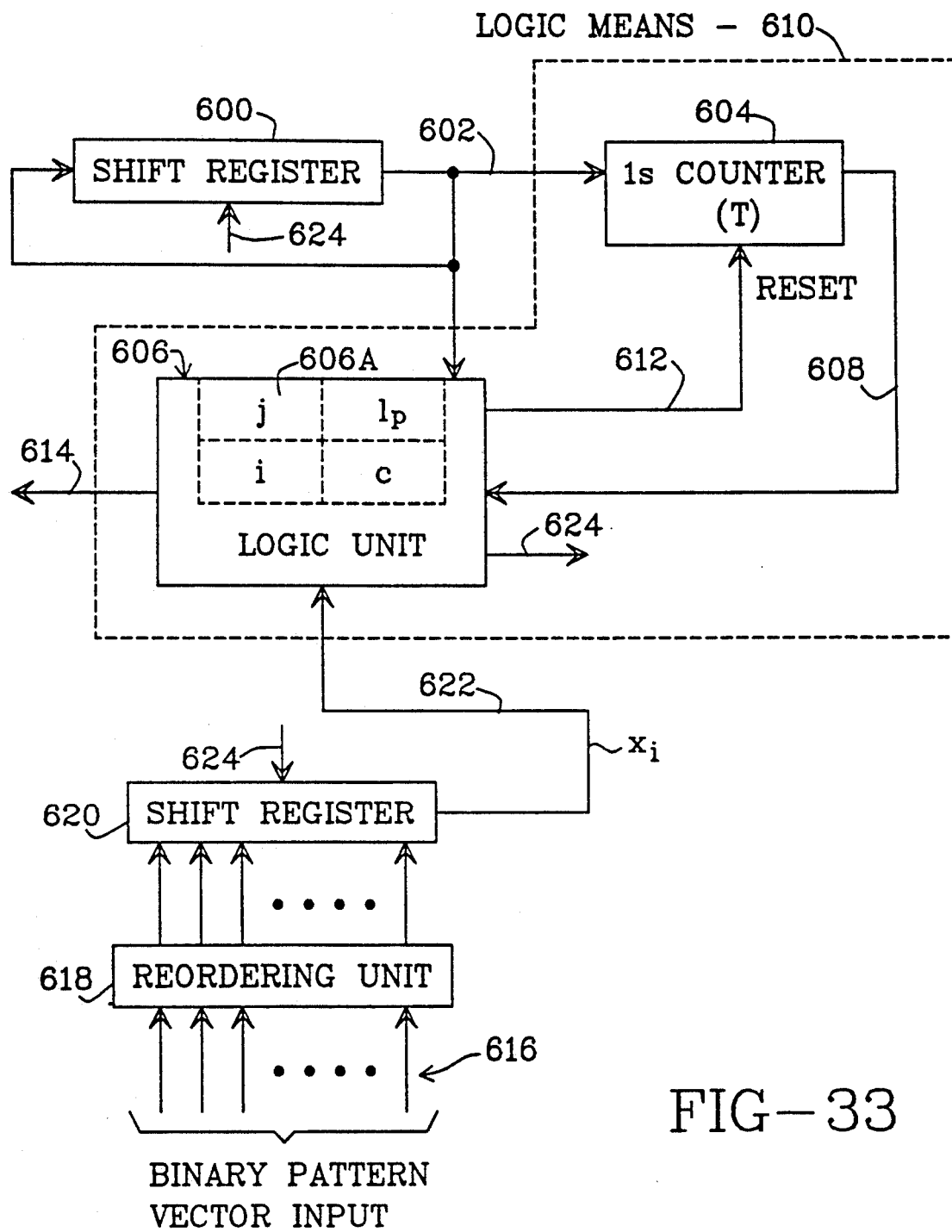
FIG. 33 is a block diagram showing a system employing a binary tree sequence in memory for use in classifying binary pattern vectors.

Reference now is made to FIG. 33 wherein apparatus for classifying binary pattern vectors is shown, which apparatus includes tree memory means 600 comprising, for example, a circular shift register or buffer for the storage of a binary tree produced in a manner described above. The binary tree for storage in tree memory means 600 comprises a sequence of binary doublets. As described above, each doublet comprises a tree node of one of four types including no branch (00), branch left (10), branch right (01) and branch both left and right (11). The tree buffer output at line 602 is fed back to the input thereof for circulating therethrough. In addition, the tree buffer output is supplied to a 1's counter 604 and to a logic unit 606. For purpose of description, counter 604 is identified as a "T" counter, and as will become apparent, it is used to count the number of 1s in the tree levels, or layers. As described above, the number of 1s in the i-1th layer identifies the number of binary doublets, or pairs, in the ith layer. The jth node at the ith layer is identified as $n_{i,j}$.

The T counter 604 output is supplied over line 608 to logic unit 606. Counter 604 together with logic unit 606 comprise logic means 610. Logic unit outputs include a reset signal supplied to T counter 604 over line 612. The output at "class" line 614 from logic unit identifies the binary pattern vector to be classified as either a pattern recognized by the tree (a category 1 vector) or a pattern not recognized (a category 0 vector).

The binary pattern vector to be classified by the tree contained in tree memory means 600 is supplied to inputs 616 of the system. If production of the binary tree included reordering of the training pattern vectors, elements of the binary pattern vector at inputs 616 also are reordered by reordering unit 618. The pattern vector with reordered elements is supplied to input memory means 620 comprising, for example, a shift register having an output at line 622 connected to logic unit 606. Vector elements $x_i$ are sequentially supplied to the logic unit from input memory means 620. Logic unit 606 control signal outputs at line 624 are supplied to tree buffer 600 and input register 620 for control of the shifting of bits therefrom in a manner described hereinbelow. Logic unit 606 simply may comprise a microcomputer with a plurality of storage registers, or counters, identified collectively by reference character 606A. Individual counters, and/or registers, include the following:

C—a register containing the number of 1s in the i-1th layer of the tree, which in turn equals the number of binary doublets in the ith layer, $l_p$—target counter for identifying the target node, j—register containing the target node, and i—a counter containing the tree level (here levels 1 through N).

A list of rules for searching the tree using the system illustrated in FIG. 33 is included in Table II. As noted above, $n_{i,j}$ identifies the jth node at the ith level.

TABLE II

Rules for Tree Searching

1. Initialize System
   a) Set T = 0
   b) Set $l_p$ = 0
   c) Set C = 1
   d) Set j = 1
   e) Set i = 1
2. Shift out j-1 pairs of bits from tree memory 600 from the ith layer of the binary tree. Count the number of 1s in the first j-1 pairs at target counter $l_p$ and at total counter T.
3. Shift out the jth pair from the ith layer. This pair represents the target node $n_{i,j}$. Count number of 1s shifted out at total counter T.
4. If both bits in the pair are 0, output a 1 at line 614, and end search. If not, continue.
5. If first bit in the pair is a 1, add 1 to target counter $l_p$.
6. Shift $x_i$ from input memory 620.
7. If $x_i$ = 0 and the first bit at node $n_{i,j}$ is a 0, output a 0 at line 614 and end search.
8. If $x_i$ = 1 and the second bit at node n is a 0, output a 0 at line 614 and end search.
9. If $x_i$ = 1 and the second bit at node $n_{i,j}$ is a 1, add 1 to target counter $l_p$.
10. Shift out (C-j) additional pairs from the ith layer. Count number of 1s shifted out at total counter T.
11. Store $l_p$ from target counter in j register, and reset target counter to 0.
12. Store total count T from total counter in C register and reset total counter.
13. Increment i counter.
14. If there are N elements in the binary pattern vector and i < N, go to 2. The search now is in the next tree level. If i = N, go to 15.
15. Shift out j pairs from binary tree and shift $x_N$ from input memory. If $x_N$ = 0 and the first bit of the jth pair in the Nth level is a 1, output a 1 at line 614. If $x_N$ = 1 and the second bit of the jth pair is a 1, output a 1 at line 614. Otherwise, output a 0.
16. End A brief description of the operation of the system shown in FIG. 33 now will be made assuming that the binary tree sequence and binary vector to be classified illustrated in FIG. 16 are loaded in tree memory 600 and input memory 620, respectively. (The tree also is illustrated in FIG. 5.) Only the three levels of the tree shown in FIG. 5 need be loaded into buffer 600. These comprise the binary sequence of 11001010. In this example, as above, the binary vector to be classified ($x_1\ x_2\ x_3$) is 100.

As seen in Table II, at step 1, the total, T, and target, $l_p$, counters are set to 0, the C and j registers are loaded with a 1, and the i counter is set to 1. At step 2 j-1=0 pairs of bits are shifted from the first level of the tree. In this case no bits are shifted. At step 3 the jth, or 1st, pair of bits is shifted from the first level. The two 1 bits at the first level are counted by T counter 604 so that T now equals 2. Since both bits are not equal to 0, operation goes to step 5 where a 1 is added to target counter $l_p$. The first bit $x_1$=1 is shifted from input memory 620. Steps 7 and 8 are not applicable whereby operation proceeds to step 9. Since $x_1$=1 and the second bit ($t_1$) also is a 1, one is added to the target counter whereby $l_p$=2. At step 10, C-j (i.e. 1-1=0) additional bits are shifted from level i of the binary tree. In this instance, no additional bits are shifted from the tree, and total counter T is not incremented. At step 11, $l_p$=2 is stored in the j register and the target counter is reset to 0. At step 12, T =2 is stored in the C register and total counter 604 is reset to 0. The i counter is incremented to 2 at step 13. At step 14, it is determined that the tree level i, which equals 2, is less than the total number of vector elements N, which equals 3. As a result, operation returns to step 2.

At step 2, j-1=1 pair of bits are shifted from the 2nd layer of the tree. In this instance the binary pair 00 are shifted from tree memory 600. The total counter 604 is not incremented since neither bit comprises a 1 bit. At step 3, the target pair, i.e. the second pair, of bits is shifted from the second level of the tree. The second pair is 10 whereupon the count of total counter 604 is increased by 1 from 0 to 1. Since both bits are not 0, operation proceeds through step 4 to step 5. At step 5 it is determined that the first bit in the pair is a 1 whereby target counter $l_p$ is incremented from 0 to 1. Next, at step 6, second bit $x_2=0$ is shifted from input memory 620. Since the first bit of the second target pair 10 is not 0, step 7 does not apply whereupon operation proceeds to step 8. Since $x_2$ does not equal 1, step 7 does not apply whereupon operation proceeds to step 9. At step 9, target counter, $l_p$, is not incremented since $x_2=0$. At step 10 C−j (i.e. 2−2=0) additional bits are shifted from level 2 of the binary tree. Again, no additional bits are shifted from the tree, and count at total counter T remains at 1. At step 11, $l_p=1$ is stored in the j register and the target counter is reset to 0. At step 12, T =1 is stored in the C register and total counter 604 is reset to 0. The i counter is incremented to 3 at step 13. At step 14 it is determined that the tree level i, which equals 3, equals the total number of vector element N. Consequently, operation proceeds to step 15 rather than returning to step 2.

At step 15, j pairs are shifted from the third layer of the tree and $x_N$ is shifted from input memory means 620. Here, where 1 is stored in the jth register, one pair (10) is shifted from the third level of the tree. At step 15 it is determined that $x_3=0$ and that the first bit of the jth pair is a 1. Consequently, a 1 is outputed at line 614 of logic unit 606 indicating that the vector 100 is classified as a 1 vector. Operation ends at step 16.

From the above, it will be apparent that only simple operations are required of logic unit 606, which operations may be performed using a microcomputer. Only a short, simple, program is required to implement the logic unit operations in a computer. Obviously, hardwired logic may be employed in place of a digital computer. A computer simply provides for greater flexibility than hard-wired logic. Also, it will be apparent that a logic unit 606 may be used to obtain a count of 1s in each layer, in which event separate counter 604 may be eliminated from the system and its function performed in logic unit 606. As seen in the drawings, logic means 610 performs the functions of both logic unit 606 and counter 604.

The invention having been described in detail, in accordance with requirements of the Patent Statutes, various other changes and modifications will suggest themselves to those skilled in this art. For example, in the above-described process of activating nodes of a binary tree in preparation of pruning the same, every node through which a category 0 vector passes is identified as an activated node, which node is not pruned, or altered, during the tree pruning process. If, however, the training set is "noisy", the number of nodes can be further reduced by counting the number of times a category 1 training pattern vector passes through each node, and the number of times a category 0 training pattern vector passes through each node. Then, a node is identified as "activated" only if the ratio of category 0 to category 1 passes through that node is greater than a threshold. For example, a threshold in the range of 0.2 to 0.5 may be employed. If the threshold is not exceeded, then the node is not activated, and if it is exceeded, the node is activated. In addition, even if a node is identified as being activated, if the number of training pattern vectors passing through the node does not exceed a predetermined percent of the total number of training pattern vectors, the activated condition is removed. For example, only this second threshold may be on the order 0.01 to 0.05. Following such modified form of activating nodes, the binary tree may be trimmed, or pruned, in the manner described above. Obviously, the invention is not limited to the above-described method of reducing the number of activated nodes during the pruning process. Also, it will be apparent that the binary doublets may be used to identify different binary tree nodes than those described above. For example, no branch, branch only left, branch only right and branch both left and right may be identified by the doubles 01, 00, 11, 10, respectively. The illustrated assignment of binary doublets to nodes is for convenience, but obviously is arbitrary. Similarly, it will be apparent that binary vector elements 0 and 1 may identify branch right and branch left paths, respectively. Again, the illustrated assignment of the binary elements to left or right branches is for convenience and is completely arbitrary. It is intended that the above and other such changes and modifications shall fall within the spirit and scope of the invention defined in the appended claims.

We claim:

1. In a method for producing a binary tree for pattern recognition use, or the like, steps comprising
   a) obtaining a set of binary training pattern vectors some of which are associated with a first pattern and the remainder of which are not associated with said first pattern, those training pattern vectors associated with the first pattern being identified as category 1 training pattern vectors and the remainder of the training pattern vectors which are not associated with said first pattern being identified as category 0 training pattern vectors, each said binary training pattern vector including the same number, N, of vector elements, and
   b) using the set of binary training pattern vectors as inputs to a computer, generating a binary tree having at least N levels and storing the tree in computer memory, which binary tree comprises a sequence of binary two-bit doublets each of which doublets comprises a tree node of one of four types including "no branch", "branch only left", "branch only right" and "branch both left and right" node.

2. In a method as defined in claim 1 wherein step b) includes
   using only category binary training pattern vectors from the set of vectors as computer inputs, generating an unpruned binary tree and storing the same in computer memory,
   using only category 0 binary training pattern vectors from the set of vectors as computer inputs, traversing the unpruned binary tree and identifying nodes traversed by said category 0 vectors as activated nodes, and nodes not traversed by said category 0 vectors as unactivated nodes,
   removing from the unpruned binary tree unactivated nodes which are connected to a next higher level unactivated node, and converting any remaining unactivated "branch both left and right" nodes to "no branch" nodes.

3. In a method as defined in claim 2 including,
during generation of the unpruned binary tree, counting the number of times that category 1 binary training pattern vectors traverse each node of the tree,
while traversing the unpruned binary tree by category 0 vectors, counting the number of times each node is traversed,
changing nodes as identified as activated to unactivated when the ratio of category 0 to category 1 traverses is below a threshold value.

4. In a method as defined in claim 2 wherein the set of binary training pattern vectors is supplied only once to the computer for generation of a pruned binary tree.

5. In a method as defined in claim 1 wherein the category 1 and category 0 binary training pattern vectors are randomly ordered, and wherein
step b) comprises repeatedly supplying the set of binary training pattern vectors as inputs to the computer for generating a binary tree which requires no subsequent pruning.

6. In a method as defined in claim 1 wherein the binary doublets for each level of the binary tree are stored in contiguous memory addresses without spacing or separators between doublets.

7. In a method as defined in claim 1 including supplying vectors to be classified to a computer with the sequence of binary doublets stored in computer memory and distinguishing between category 1 and category 0 vectors supplied thereto.

8. In a method as defined in claim including reordering vector elements of all of the binary training vectors before generating a binary tree for reducing the number of nodes in the generated binary tree.

9. In a method as defined in claim 8 including,
determining the total number of 1s and total number of 0s at each vector element for the set of binary training pattern vectors, and
using the above-determined totals, reordering the vector elements of all of the binary training pattern vectors in descending order of one of the totals of 1s and 0s before generating a binary tree.

10. In a method as defined in claim 8 wherein the reordering step includes reordering the vector elements of all binary training pattern vectors in descending order of one of the total of 1s and total of 0s at each vector element for the set of binary training pattern vectors.

11. In a method as defined in claim 1 wherein step a) includes optically reading a plurality of input characters to be recognized to form binary vectors, some of which vectors comprise category 1 vectors and the other of which comprise category 0 vectors.

12. In a method as defined in claim 1 wherein step a) includes obtaining the set of binary training pattern vectors from the inputs and associated output of a processing element of a trained artificial neural network in response to different inputs supplied to the neural network, the inputs and output of which processing element are in binary or bi-polar form, the inputs to the processing element identifying the pattern vectors and the associated outputs identify the vector category, the resultant binary tree being useable as a substitution for said processing element of the trained artificial neural network.

13. In a pattern recognition method, or the like, employing a set of training pattern vectors which set includes a plurality of groups of vectors, each of which groups is associated with a pattern to be recognized, steps during a training mode including,
using training pattern vectors from every group thereof, producing one first binary tree for each pattern to be recognized, each said first binary tree being adapted for recognizing a different one of said patterns to be recognized, and
using training pattern vectors from every group thereof, producing an associated second binary tree for each said first binary tree, each said second binary tree being adapted for recognizing every pattern except the pattern recognized by the associated first binary tree, each said binary tree having N input levels where N is a whole number.

14. In a pattern recognition method, or the like, employing a set of training pattern vectors which set includes a plurality of groups of vectors, each of which groups is associated with a pattern to be recognized, steps during a training mode including,
using training pattern vectors from every group thereof, producing one first binary tree for each pattern to be recognized, each said first binary tree being adapted for recognizing a different one of said patterns to be recognized, and
using training pattern vectors from every group thereof, producing an associated second binary tree for each said first binary tree, each said second binary tree being adapted for recognizing every pattern except the pattern recognized by the associated first binary tree, each said binary tree having N input levels where N is a whole number,
the steps of producing first and second binary trees includes generating in computer memory a sequence of binary two-bit doublets for each of said trees, each of which doublets comprises a tree node of one of four types including "no branch", "branch only left", "branch only right" and "branch both left and right".

15. In a method as defined in claim 13 which includes reordering elements of the training pattern vectors before producing said binary trees for reducing the number of nodes included in said trees.

16. In a method as defined in claim 15 wherein training pattern vectors are in binary form and each includes N vector elements.

17. In a method as defined in claim 16 including operating mode steps for recognizing binary pattern vectors having N vector elements, steps comprising
supplying the N vector elements of the binary pattern vector to be recognized to the N input levels of each of the first and second binary trees, and
in the presence of an output from one of the first binary trees, classifying the vector in accordance with the pattern recognized by said binary tree.

18. In a method as defined in claim 17 including
in the absence of an output from one of said first binary trees, changing the vector element of the binary pattern vector to be recognized at the binary tree level at which the path traversed by said vector terminates,
then, in the presence of an output from one of the first binary trees, classifying the vector in accordance with the pattern recognized by said binary tree.

19. In a pattern recognition method, or the like, employing a set of binary training pattern vectors, a vector element reordering method including,
   a) obtaining a measure of variability for each vector element of at least some binary training pattern vectors included in said set, and
   b) reordering the vector elements of the binary training pattern vectors dependent upon the measure of variability obtained in step a).

20. In a method as defined in claim 19 wherein step b) includes reordering the vector elements in order of increasing variability.

21. In a method as defined in claim 19 wherein step a) comprises
   c) locating clusters of vectors in the set of binary training pattern vectors,
   d) obtaining a measure of entropy of each vector element for each cluster, and
   e) using the measures of entropy obtained in step d), obtaining a measure of entropy of each vector element over all the clusters,
   and wherein step b) comprises reordering vector elements of the set dependent upon the entropy measurements obtained in step e).

22. In a method as defined in claim 21 wherein step b) includes reordering vector elements in ascending order of the measure of entropy obtained in step e).

23. In a method as defined in claim 21 wherein step d) includes for each vector element of each cluster, calculating the probability that the element equals 1,
   for each vector element of each cluster, calculating the probability that the element equals 0, and
   employing the calculated probabilities to obtain said measure of entropy of each vector element for each cluster.

24. In a pattern recognition method, or the like, employing a set of training pattern vectors which set includes a group of vectors associated with a pattern category to be recognized, the remainder of which vectors are not associated with said pattern category,
   steps during a training mode including,
   a. using said set of training pattern vectors, producing a first binary tree for recognizing pattern category vectors,
   b. using said set of training pattern vectors, producing a second binary tree adapted for recognizing vectors not included in said group associated with the pattern category,
   steps during pattern vector classification mode including,
   c. supplying a vector to be classified to said first and second binary trees,
   d. in the presence of a 1 output from said first binary tree, identifying the vector as belonging to the pattern category, and in the presence of a 1 output from said second binary tree, identifying the vector as not belonging to the pattern category,
   e. in the presence of a 0 output from both of the first and second binary trees, changing the vector element of the vector at the tree level at which the path in the trees traversed by the vector terminates, and
   f. repeating steps d and e until the vector is identified as either belonging to the pattern category or not belonging to the pattern category.

25. A method of classifying binary vectors by use of a binary tree which tree comprises a sequence of binary two-bit doublets each of which doublets comprises a node of one of four types including no branch, branch only left, branch only right, and branch both left and right, and wherein the binary vector specifies a path to be followed in the binary tree, binary vector elements 0 and 1 identifying branch left and branch right paths, respectively, said method comprising:
   sequentially shifting binary doublets from the binary tree starting at the root node of the tree,
   identifying those binary tree doublets in the path specified by the vector to be classified,
   if the identified binary tree doublet identifies a no branch node, classifying the vector as one to be identified by the binary tree, and
   if the identified binary tree doublet identifies a node which does not include a branch in the direction indicated by the associated vector element, then classifying the vector as one which is not identified by the binary tree.

26. A method as defined in claim 25 including,
   if the identified binary tree doublet at the tree level equal to the number of elements in the binary vector identifies a node which includes a branch in the direction indicated by the associated vector element, then classifying the vector as one to be identified by the binary tree.

27. A system for classifying binary vectors which produces a first signal when the binary vector is identified as belonging to a class to be identified and produces a second signal when the binary vector is one which is identified as not belonging to said class, said system comprising,
   tree memory means containing a binary tree comprising a sequence of binary two-bit doublets each of which doublets comprises a node of one of four types including no branch, branch only left, branch only right, and branch both left and right,
   input memory means containing a binary vector which specifies a path to be followed in the binary tree,
   logic means,
   means for supplying binary doublets from said tree memory means and vector elements from said input memory means to said logic means,
   said logic means in response to binary doublets and vector elements supplied thereto producing a first signal when the binary vector supplied thereto from said input memory means belongs to the class to be identified and producing a second signal when the binary vector does not belong to said class.

28. A system as defined in claim 27 wherein said logic means controls the supply of binary doublets from said tree memory means and vector elements from said input memory means to said logic means.

* * * * *